(12) United States Patent
Lin

(10) Patent No.: US 6,853,797 B2
(45) Date of Patent: Feb. 8, 2005

(54) COMPACT OPTICAL EQUALIZER

(75) Inventor: Wenhua Lin, Pasadena, CA (US)

(73) Assignee: Kotura, Inc., Monterey Park, CA (US)

( * ) Notice: Subject to any disclaimer, the term of this patent is extended or adjusted under 35 U.S.C. 154(b) by 354 days.

(21) Appl. No.: 09/991,893

(22) Filed: Nov. 5, 2001

(65) Prior Publication Data

US 2003/0086677 A1 May 8, 2003

(51) Int. Cl.⁷ .................................................. G02B 6/26
(52) U.S. Cl. ........................ 385/140; 385/134; 359/599
(58) Field of Search ............................. 385/15, 27, 37, 385/140

(56) References Cited

U.S. PATENT DOCUMENTS

| | | | |
|---|---|---|---|
| 4,618,210 A | 10/1986 | Kondo | |
| 4,747,654 A | 5/1988 | Yi-Yan | |
| 4,813,757 A | 3/1989 | Sakano et al. | |
| 4,846,542 A | 7/1989 | Okayama et al. | |
| 5,002,350 A | 3/1991 | Dragone | |
| 5,013,113 A | 5/1991 | Soref | |
| 5,039,993 A | 8/1991 | Dragone | |
| 5,243,672 A | 9/1993 | Dragone | |
| 5,412,744 A | 5/1995 | Dragone | |
| 5,450,511 A | 9/1995 | Dragone | |
| 5,467,418 A | 11/1995 | Dragone | |
| 5,581,643 A | 12/1996 | Wu | |
| 5,706,377 A | 1/1998 | Li | |
| 5,841,931 A | 11/1998 | Foresi et al. | |
| 5,938,811 A | 8/1999 | Greene | |
| 6,108,478 A | 8/2000 | Harpin et al. | |
| 6,118,909 A | 9/2000 | Chen et al. | |
| 6,266,464 B1 * | 7/2001 | Day et al. ...................... | 385/37 |
| 6,272,270 B1 | 8/2001 | Okayama | |
| 6,374,013 B1 * | 4/2002 | Whiteaway et al. ........... | 385/37 |
| 6,452,718 B1 * | 9/2002 | Augustsson .............. | 359/337.1 |
| 6,507,680 B1 * | 1/2003 | Nishimura et al. ........... | 385/14 |
| 6,539,158 B2 * | 3/2003 | Kashihara et al. .......... | 385/129 |
| 6,636,657 B1 * | 10/2003 | Aksyuk et al. ............... | 385/24 |
| 2001/0033715 A1 * | 10/2001 | Delisle et al. ................ | 385/37 |

FOREIGN PATENT DOCUMENTS

| | | |
|---|---|---|
| EP | 0647861 A1 | 4/1995 |
| EP | 0985942 A2 | 3/2000 |
| JP | 63-197923 | 8/1988 |
| JP | 2-179621 | 7/1990 |
| JP | 6-186598 | 7/1994 |

OTHER PUBLICATIONS

Doerr et al., *Automatic Wavelength Channel–By–Channel Equalizer*, OFC 2000, pp. 227–229.

Doerr et al., *2x2 Wavelength–Selective Cross Connect Capable of Switching 128 Channels in Sets of 8*, OFC 2000, pp. 1–3.

Okayama et al., *Node Comprising Tunable Gratings*, Electronics Letters, 8$^{th}$ May 1997, vol. 33, No. 10, pp. 881–882.

Takiguchi et al., *Dipsersion Compensation Using a Planar Lightwave Circuit Optical Equalizer*, Proc. IEEE Photonics Technology Lett, 6, No. 4, Apr. 1994, pp. 561–564.

(List continued on next page.)

*Primary Examiner*—John D. Lee
*Assistant Examiner*—Jennifer Doan
(74) *Attorney, Agent, or Firm*—Gavrilovich, Dodd & Lindsey, LLP

(57) ABSTRACT

An equalizer is disclosed. The equalizer includes a light distributor configured to distribute light signals received through an inlet side across an outlet side. Each of the light signals is associated with a different wavelength. The equalizer also includes optics configured to cause different light signals to separate as the light signals travel through the light distributor. The equalizer also includes a plurality of attenuators configured to attenuate the light signals in a region of the light distributor where the light signals are separated from one another.

16 Claims, 13 Drawing Sheets

OTHER PUBLICATIONS

Zimgibl et al., *Digitally Tunable Channel Dropping Filter/Equalizer Based on Waveguide Grating Router and Optical Amplifier Integration*, IEEE Photnics Technology Letters, vol. 6, No. 4, Apr. 1994, pp. 1–3.

Abe, et al., *Optical Path Length Trimming Technique using Thin Film Heaters for Silica–Based Waveguides on Si*, Electronics Letters, Sep. 12, 1996, vol. 32–No. 19, pp. 1818–1820.

Albert, J., *Planar Fresnel Lens Photoimprinted in a Germanium–Doped Silica Optical Waveguide*, Optics Letters, May 15, 1995, vol. 20–No. 10, pp. 1136–1138.

Aman, M.C., *Calculation of Metal–Clad Ridge–Waveguide (MCRW) Laser Modes by Mode Coupling Technique*, Journal of Lightwave Technology, vol. LT–4, No. 6, Jun. 1988, pg. 689–693.

Amann, M.C. et al, *Calculation Of The Effective Refractive–Index Step For The Metal–Cladded–Ridge–Waveguide Laser*, Applied Optics, vol. 20, No. 8, Apr. 15, 1981, pg. 1483–1486.

Baba, S. et al., *A Novel Integrated–Twin–Guide (ITG) Optical Switch with a Built–in TIR Region*, IEEE Photonics Technology Letters; vol. 4, No. 5, May 1992, pg. 486–488.

Benson, T.M., *Etched–Wall Bent–Guide Structure for Integrated Optics in the III–V Semiconductors;* Journal of Lightwave Technology, vol. LT–2, No. 1, Feb. 1984; pg. 31–34.

Berry, G.M. et al., *Analysis Of Multiplayer Semiconductor Rib Waveguides With High Refractive Index Substrates*, Electronics Letters; vol. 29, No. 22; Oct 28, 1993, pg. 1941–1942.

Betty, I. et al., *A Robust, Low Crosstalk, InGaAsP/InP Total–Internal–Reflection Switch For Optical Cross–Connect Application*.

Burke, S.V., *Spectral Index Method Applied to Coupled Rib Waveguides;* Electronics Letters, vol. 25, No. 9, Apr. 27, 1989, pg. 605–606.

Burns, W.K. et al., *Mode Conversion in Planar–Dielectric Separating Waveguides;* IEEE Journal of Quantum Electronics, vol. QE–11, No. 1, Jan. 1975; pg. 32–39.

Cai, Y. et al., *A Novel Three–Guide Optical Coupler Using A Taper–Formed Waveguide;* J. Appl. Phys 69(5), Mar. 1991; pg. 2810–2814.

Cavailles, J.A. et al., *First Digital Optical Switch Based on InP/GainAsP Double Heterstructure Waveguides:* Electronics Letters, vol. 27, No. 9, Apr. 25, 1991, pg. 699–700.

Chen, R.T. et al, *Design and Manufacturing of WDM Devices;* Proceedings of SPIE vol. 3234.

Clemens, et al., *Wavelength–Adaptable Optical Phased Array in $SiO_2$–Si,* Photonics Technology Letters, Oct. 1995, vol. 7–No. 10, 1040–1041.

Dagli, N. et al., *Analysis of Rib Dielectric Waveguides;* IEEE Journal of Quantum Electronics, vol. QE–21, No. 4, Apr. 1985, pg. 315–321.

Dagli, N. et al., *Theoretical and Experimental Study of the Analysis and Modeling of Integrated Optical Components;* IEEE Journal of Quantum electronics, vol. 24, No. 11, Nov. 1988; pg. 2215–2226.

Deri, R.J., et al., *Low–Loss GaAs/AlGaAs Waveguide Phase Modulator Using A W–Shaped Index Profile;* Sep. 6, 1988.

Deri, R.J., et al., *Low–Loss Multiple Quantum Well GaInAs/InP Optical Waveguides;* Feb. 21, 1989.

Devaux, F. et al., *20Gbit/s Operation of a High–Efficiency InGaAsP/InGaAsP MQW Electroabsorption Modulator With 1.2–V Drive Voltage;* IEEE Photonics Technology Letters, vol. 5, No. 11, Nov. 1993, pg. 1288–1290.

Doerr, C.R. et al., *Chirping Of The Waveguide Grating Router For Free–Spectral–Range Mode Selection In The Multifrequency Laser,* IEEE Photonics Technology Letters, Apr. 1996, vol. 8–No. 4, pp. 500–502.

Doerr, C.R. et al., *Chromatic Focal lane Displacement in the Parabolic Chirped Waveguide Grating Router,* May 1997, vol. 9–No. 5, pp. 625–627.

Dragone, c. *Efficient NxN Star Couplers Using Fourier Optics*, pp. 479–448, Mar. 1989, vol. 7–No. 3, Journal of Lightwave Technology.

Fischer, et al., *Singlemode Optical Switches Based on SOI Waveguides with Large Cross–Section,* Electronics Letters, Mar. 3, 1994, vol. 30–No. 5, pp. 406–408.

Fischer, K. et al, *Sensor Application Of SiON Integrated Optical Waveguides On Silicon;* Elevier Sequoia, 1992; pg. 209–213.

Fish, G. et al., *Monolithic InP Optical Crossconnects: 4x4 and Beyond,* JWB2–1, pg. 19–21.

Furuta, H. et al, *Novel Optical Waveguide For Integrated Optics,* Applied Optics, vol. 13, No. 2, Feb. 1974, pg. 322–326.

Gini, E. et al., *Low Loss Self–Aligned Optical Waveguide Corner Mirrors in InGaAsP/InP,* We P2.22.

Goel, K. et al *Design Considerations for Low Switching Voltage Crossing Channel Switches;* Journal of Lightwave Technology vol. 6, No. 6, Jun. 1988; pg. 881–886.

Granestrand, P. et al., *Integrated Optics 4x4 Switch Matrix with Digital Optical Switches;* Electronics Letters, vol. 26, No. 1, Jan. 4, 1990; pg. 4–5.

Himeno, A. et al, *Loss Measurement and Analysis of High–Slice Reflection Bending Optical Waveguides,* Journal of Lightwave Technology, Jan. 1988, vol. 6–No. 1, 41–46.

Hsu, K.Y. et al., *Photonics devices and Modules,* www.c-c.nctu.edu.tw/~ctr/lee_mti/research_topic/photonic_devices_modules.htm, pp. 1–3.

Huang, T.C. et al., *Depletion Edge Translation Waveguide Crossing Optical Switch;* IEEE Photonics Technology Letters; vol. 1, No. 7, Jul. 1989, pg. 168–170.

Hutcheson. L.D. et al, *Comparison of Bending Losses in Integrated Optical Circuits;* Optics Letters, vol. 5, No. 6, Jun. 1980, pg. 360–362.

Inoue, H. et al, *Low Loss GaAs Optical Waveguides,* Journal of Lightwave Technology, vol. LT–3, No. 6, Dec. 1985; pg. 204–209.

Irace, A. et al., *Fast Silicon–on–Silicon Optoelectronic Router Based on a BMFET Device,* Journal of Selected Topics in Quantum Electronics, Jan./Feb. 2000, vol. 6–No. 1, pp. 14–18.

Ito, F. et al., *Carrier–Injection–Type Optical Switch in GaAs With A 1.06–1.55 $\mu m$ Wavelength Range;* Appl. Physics Letters, 54(2) Jan. 9, 1989; pg. 134–136.

Jackman, N. et al., *Optical Cross Connects for Optical Networking;* Bell Labs Technical Journal, Jan.–Mar. 1999; pg. 262–281.

Johnston, I.R., et al., *Silicon–Based Fabrication Process For Production Of Optical Waveguides;* IEE Proc–Optoelectron., vol. 143, No. 1, Feb. 1996, pg. 37–40.

Kaenkno, A. et al., *Athermal Silica–based Arrayed–Waveguide Grating (AWG) Multiplexers with New Low Loss Groove Design;* TuO1–1, pg. 204–206.

Kashara, R. et al., *Low–Power Consumption Silica–Based 2x2 Thermooptic Switch Using Trenched Silicon Substrate*, IEEE Photonics Technology Letters, vol. 11, No. 9, Sep. 1999, pg. 1132–1134.

Khan, M.N. et al., *Fabrication–Tolerant, Low–Loss, and High–Speed Digital Optical Switches In InGaAsP/InP Quantum Wells*; Proc 21$^{st}$ Eur. Conf. on Opt. Comm.(ECOC '95–Brussels), pg. 103–106.

Khan, M.N. et al., *High–Speed Operation of Quantum Well Electron Transfer Digital Optical Switches*; pg. 102–102c.

Kirihara, T. et al., *Lossless And Low Crosstalk 4x4 Optical Switch Array*; Electronics And Communications In Japan, Part 2, vol. 77, No. 11, 1994, pg. 73–81.

Kirihara, T. et al., *Lossless and Low–Crosstalk Characteristics In an InP/Based 2x2 Optical Switch*, IEEE Photonics Technology Letters, vol. 5, No. 9 Sep. 1993, pg. 1059–1061.

Kokubun, Y. et al., *Athermal Waveguides for Temperature–Independent Lightwave Devices*, Nov. 1993, 1297–1298, vol. 5–No. 11, IEEE Photonics Technology Letters.

Kokubun, Y. et al., *Temperature–Independent Narrowband Optical Filter at 1.3 μm Wavelength by an Athermal Waveguide*, 10$^{th}$ Oct. 1996, vol. 32–No. 21, Electronics Letters.

Kokubun, Y. et al., *Temperature–Independent Optical Filter at 1.55 μm Waveguide Using a Silica–Based Athermal Waveguide*, Feb. 19, 1998, vol. 34–No. 4, Electronics Letters.

Kokubun, Y. et al., *Three–Dimensional Athermal Waveguides for Temperature Independent Lightwave Devices*, 21$^{st}$ Jul. 1994, vol. 30–No. 15, Electronics Letters.

Kostrezewa, C. et al., *Tunable Polymer Optical Add/Drop Filter for Multiwavelength Networks*, Photonics Technology Letters, Nov. 1997, vol. 9–No. 11, 1487–1489.

Laakman, K.D. et al., *Waveguides: Characteristic Modes Of Hollow Rectangular Dielectric Waveguides*; Applied Optics, vol. 15, No. 5, May 1976; pg. 1334–1340.

Lee, T.P. et al., *Al$_x$Ga$_{1-x}$As Double–Heterostructure Rib–Waveguide Injection Laser*: IEEE Journal of Quantum Electronics, vol. QE–11, No. 7., Jul. 1975; pg. 432–435.

Liu, Y.L. et al., *Silicon 1x2 Digital Optical Switch Using Plasma Dispersion*; Electronics Letters, vol. 30, No. 2, Jan. 20, 1994; pg. 130–131.

Mak, G. et al., *High–Speed Bulk InGaAsP–InP Electroabsorption Modulators with Bandwidth in Excess of 20 GHz*, IEEE Photonics Technology Letter, vol. 2, No. 10, Oct. 1990, pg. 730–733.

Marcatili, E., *Improved Coupled–Mode Equations for Dielectric Guides*; IEEE Journal of Quantum Electronics, vol. QE–22, No. 6, Jun. 1986; pg. 988–993.

Marcatili, E.A.J., *Bends in Optical Dielectric Guides*; The Bell System Technical Journal, Sep. 1969; pg. 2103–2132.

Marcatili, E.A.J., *Dielectric Rectangular Waveguide and Directional Coupler for Integrated Optics*, The Bell System Technical Journal, Sep. 1969 pg. 2071–2101.

Marcatili, E.A.J., *Slab–Coupled Waveguides*; The Bell System Technical Journal, Apr. 1974; American Telephone & Telegraph Company, vol. 53, No. 4, Apr. 1974.

Mirza, A.R. et al, *Silicon Wafer Bonding For MEMS Manufacturing*, Solid State Technology, Aug. 1999, pg. 73–78.

Moerman, I. et al., *A Review on Fabrication Technologies for the Monolithic Integration of Tapers with III–V Semiconductor Devices*; IEEE Journal of Selected Topics in Quantum electronics, vol. 3, No. 6, Dec. 1997, pg. 1308–1320.

Müller, G. et al., *First Low Loss InP/InGaAsP Optical Switch with Integrated Mode Transformers*; ThC12.10; pg. 37–40.

Nayyer, J. et al., *Analysis of Reflection–Type Optical Switches with Intersecting Waveguides*, Journal of Lightwave Technology, vol. 6, No. 6, Jun. 1988; pg. 1146–1152.

Negami, t. et al., *Guided–Wave Optical Wavelength Demultiplexer Using An Asymmetric Y Junction*; Appl. Phys. Lett. 54(12), Mar. 20, 1989; pg. 1080–1082.

Nelson, W. et al., *Optical Switching Expands Communications–Network Capacity*, Laser Focus World, Jun. 1994, pg. 517–520.

Nelson, W.H. et al., *Wavelength–and Polarization–Independent Large Angle InP/InGaAsP Digital Optical Switches with Extinction Ratios Exceeding 20 dB*; IEEE Photonics Technology Letters, vol. 6, No. 11, Nov. 1994; pg. 1332–1334.

Noda, Y. et al., *High–Speed Electroabsorption Modulator with Strip–Loaded GaInAsP Planer Waveguide*; Journal of Lightwave Technology, vol. LT–4, No. 10, Oct. 1986, pg. 1445–1453.

Offrein, B.J. et al., *Resonant Coupler–Based Tunable Add–After–Drop Filter In Silicon–Oxynitride Technology for WDM Networks*, Journal of Selected Topics in Quantum Electronics, vol. 5–No. 5, 1400–1405.

Okamoto, K. et al., *Arrayed–Waveguide Grating Multiplexer Wtih Flat Spectral Responser*, Optics Letters, Jan. 1, 1995; vol. 20, No. 1; pg. 43–45.

Okamoto, K. et al., *Flat Spectreal Response Arrayed–Waveguide Grating Multiplexer with Parabolic Waveguide Horns*, Electronics Letters Online, Jul. 15, 1996, No. 19961120, pp. 1661–1662.

Okayama, H. et al., *8x8 TLLiNbO$_3$ Waveguide Digital Optical Switch Matrix*; IEICE Trans. Commun.; vol. E77–8, No. 2; Feb. 1944; pg. 204–208.

Okayama, H. et al., *Dynamic Wavelength Selective Add/Drop Node Comprising Tunable Gratings*, Electronics Letters Online, Apr. 10, 1997, No. 19970607.

Okayama, H. et al., *Reduction of Voltage–Length Product for Y–Branch Digital Optical Switch*, Journal of Lightwave Technology, vol. 11, No. 2, Feb. 1993; pg. 379–387.

Okuno, M. et al., *Strictly Nonblocking 16x16 Matrix Switch Using Silica Based Planar Lightwave Circuits*, vol. 10, No. 266, Sep. 11, 1986.

Ooba, N. et al., *Athermal Silica–Based Arrayed–Waveguide Grating Multiplexer Using Bimetal Plate Temperature Compensator*, Electronics Letters, 12$^{th}$ Oct. 2000, vol. 36, No. 21, pp. 1800–1801.

Renaud, M. et al., *Compact Digital Optical Switches for Low Insertion Loss Large Switch Arrays on InP*; Proc. 21$^{st}$ Eur.Conf.on Opt. Comm. (ECOC '95–Brussels), pg. 99–102.

Rickman, A.G. et al., *Silicon–on–Insulator Optical Rib Waveguide Loss and Mode Characterisitics*, Journal of Lightwave Technology, Oct. 1994, vol. 12–No. 10, pp. 1771–1776.

Rolland, C. et al., *10 Gbit/s, 1.56 μm, Multiquantum Well InP/InGaAsP Mach–Zehnder Optical Modulator*; Electronics Letters, Mar. 4, 1993, vol. 29, No. 5, pg. 471–472.

Santec Sales Brochure for year 2000 entitled "Optical Components".

Schauwecker, B. et al., *Small–Size Silicon–Oxymitride AWG Demultiplexer Operating Around 725 nm*, IEEE Photonics Technology Letters, vol. 12 No. 12, Dec. 2000.

Schlachetzki, A. *Monolithic IO–Technology–Modulators and Switches Based on InP,* SPIE vol. 651 Integrated Optical Circuit Engineering III (1986), pg. 60–86.

Silberberg, Y. et al., *Digital Optical Switch;* Appl. Phys. Lett.; vol. 51, No. 16, Oct. 19, 1987, pg. 152–154.

Smit, M.K., *New Focusing and Dispersive Planar Component Based on an Optical Phased Array,* Electronics Letters; Mar. 31, 1988, vol. 24, No. 7; pg. 385–386.

Smith, S.D. et al., *CW Operation of Corner Cavity Semiconductor Lasers;* IEEE Photonics Technology Letters, vol. 5, No. 8, Aug. 1993; pg. 876–879.

Sneh, A. et al., *Compact Low Crosstalk and Low Propagation Loss Quantum–Well Y–Branch Switches;* PDP 4–1 4–5.

Soole, J.B.D. et al., *Use of Multimode Interference Couplers to Broaden the Passband of Wavelength–Dispersive Integrated WDM Filters;* IEEE Photonics Technology Letters, vol. 8, No. 10, Oct. 1996; pg. 1340–1342.

Stoll, L. et al., *1:8 Optical Matrix Switch on InP/InGaAsP with Integraged Mode Transformers;* Optical Switches and Modulators II, pg. 531–534.

Stoll, L. et al., Compact and Polarization Independent Optical Switch on InP/InGaAsP; TuB7.2; pg. 337–340.

Stutius, W. et al., *Silicon Nitride Films On Silicon For Optical Waveguides,* Applied Optics, vol. 16, No. 12, Dec. 1977, pg. 303–307.

Sugie, T. et al., *1.3–µm Laser Diodes with a Butt–jointed Selectively Grown Spot–Size Converter,* ThB2–6, IOOC95, pg. 52–53.

Tada, K. et al., *Bipolar Transistor Carrier–Injected Optical Modulator/Switch: Proposal and Analysis,* IEEE Electron Device Letters, vol. EDL–7, No. 11, No. 1986, pg. 605–606.

Takada, et al. *Optical Spectrum analyzer using Cascaded AWG's with Different Channel Spacings,* Photonics Technology Letters, Jul. 1999, vol. 11, No. 7, pp. 863–864.

Takahashi, H. et al., *Arrayed Waveguide Grating for Wavelength Division Multi/Demultilexer with Nanometre Resolution,* PWG–NTT–7.

Takiguchi, K. et al., *Dispersion Compensation Using a Planar Lightwave Circuit Optical Equalizer,* Photonics Technology Letters, Apr. 1994, vol. 6, No. 4, pp. 561–564.

Tien, P.K. et al., *Formation of Light–Guiding Interconnections in an Integrated Optical Circuit by Composite Tapered–Film Coupling;* Applied Optics, vol. 12, No. 8, Aug. 1973; pg. 1909–1916.

Toyoda et al., *Thermoplastic Switch and Wavelength Tunable Filter using Polymer Waveguides,* Abstract of paper presented at Opticom 2001 on Aug. 22, 2001.

Treyz, G.V. et al., *Silicon Optical Modulators at 1.3 µm Based on Free–Carrier Absorption:* IEEE Electron Device Letters, vol. 12, No. 6, Jun. 1991; pg. 276–278.

Tsuda, H. et al., *Performance Analysis of a Dispersion Compensator Using Arrayed–Waveguide Gratings,* Journal of Lightwave Technology, Aug. 2000, vol. 18–No. 8, pp. 1139–1147.

Tsude, H. et al., *Second–and Third–Order Dispersion Compensator Using a High–Resolution Arrayed Waveguide Grating,* IEEE Photonics Technology Letters, May 1999, vol. 11–No. 5, 569–571.

Vinchant et al., *InP 4x4 Digital–Optical–Switch Module For Multiwavelength Cross–Connect Applications;* OFC '95 Technical Digest, Thursday ThK2, pg. 281–282.

Vinchant, J.F. et al., *First Polarisation Insensitive 4x4 Switch matrix on InP with Digital Optical Switches,* TuB7.3, pg. 341–344.

Vinchant, J.F. et al., *InP Digital Optical Switch; Key Element for Guided– Wave Photonic Switching;* IEE Proceedings–J, vol. 140, No. 5, Oct. 1993; pg. 301–307.

Vinchant, J.F. et al., *Low Driving Voltage or Current Digital Optical Switch on InP for Multiwavelength System Applications;* Electronics Letters, vol. 28, No. 12, Jun. 4, 1992; pg. 1135–1137.

Wakita, K. et al., *Long–Wavelength Waveguide Multiple Quantum Well Optical Modulators;* IEEE Journal of Quantum Electronics, vol. QE–23, No. 12, Dec. 1987, pg. 2210–2215.

Wanru, Z. et al., *Total Internal Reflection Optical Switch with Injection Region Isolated by Oxygen Ion Implantation;* pg. 1–10.

Yamada, et al., *Cross Talk Reduction in a 10GHz Spacing Arrayed–Waveguide Grating by Phase–Error Compensation,* Journal of Lightwave Technology, Mar. 1998, vol. 16–No. 3, pp. 364–371.

Yanagawa, H. et al., *Polarization–and Wavelength–Insensitive Guided–Wave Optical Switch with Semiconductor Y Junction;* Journal of Lightwave Technology, vol. 8, No. 8, Aug. 1990, pg. 1192–1197.

Yu, S. et al., *High Speed All–Optical Packet Routing Using A Vertical Coupler Crosspoint Space Switch.*

Yu, S. et al., *Ultralow Cross–Talk, compact integrated optical crosspoint space switch arrays employing active InP/InGaAsP/InP Vertical Waveguide Couplers,* Integrated Optical Crosspoint Switch Arrays, Slyuan Yu et al, CPD24–2.

Zengerle, R. et al., *Tapered Twin Waveguides For Spot–Size Transformation in InP;* TheB2–5; IOOC 95; pg. 50–51.

Zirngibl, M. et al., *Digitally Tunable Laser Based On The Integration Of A Waveguide Grating Multiplexer And An Optical Amplifier,* IEEE Photonics Technology Letters, Apr. 1994, vol. 6–No. 4, pp. 516–517.

Zucker, J.E. et al., *Strained Quantum Wells for Polarization–Independent Electrooptic Waveguide Switches,* Journal of Lightwave Technology, vol. 10, No. 12, Dec. 1992, pg. 1926–1930.

* cited by examiner

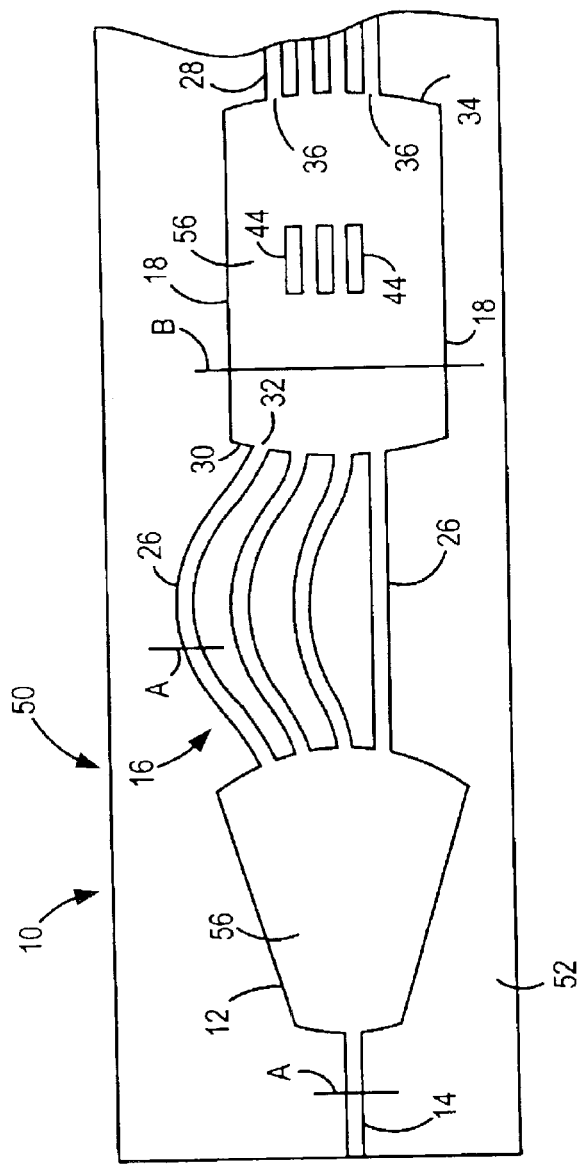
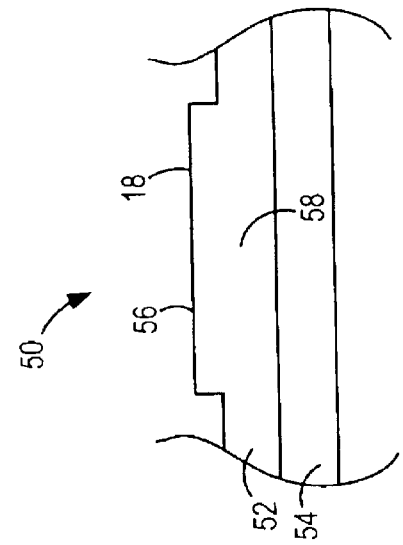
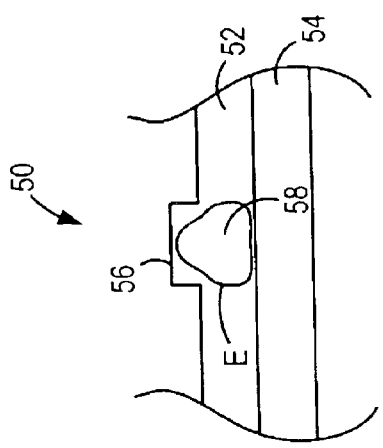
Figure 3A
Figure 3C
Figure 3B

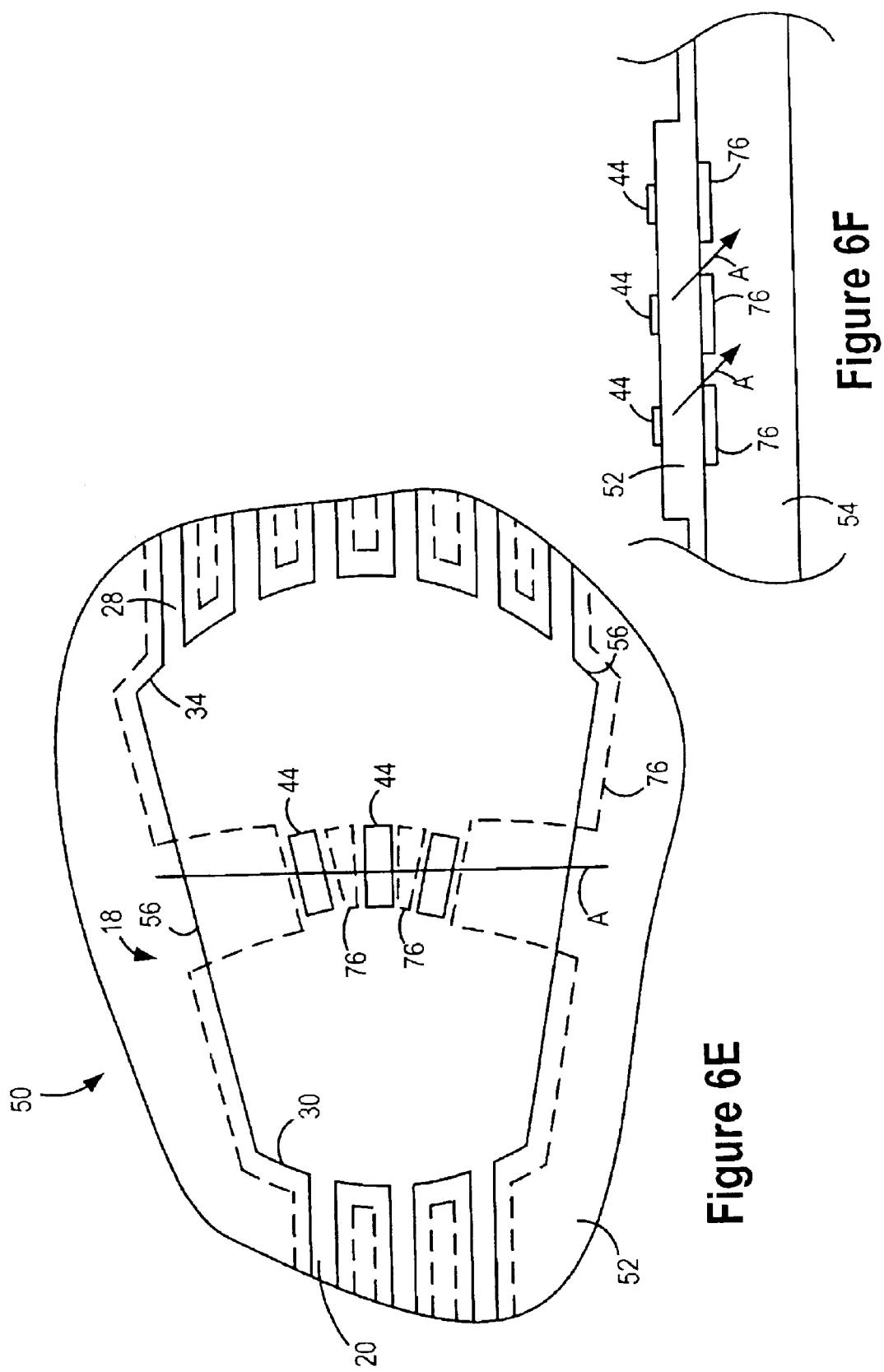

COMPACT OPTICAL EQUALIZER

FIELD OF THE INVENTION

The invention relates to one or more optical networking components. In particular, the invention relates to optical equalizers.

BACKGROUND OF THE INVENTION

Optical networks employ a variety of optical components such as optical equalizers. An equalizer is configured to operate on a beam of light signals. Each light signal is associated with different wavelengths. Different light signals often have different intensities. The equalizer provides each of the light signals with the same intensity.

A typical equalizer includes a demultiplexer for separating light signals of different wavelengths and a beam combiner for re-combining the light signals. A plurality of waveguides connect the demultiplexer and the beam combiner. Each waveguide carries a light signals of a different wavelength. Each waveguide includes an optical attenuator for attenuating the light signals traveling along a waveguide. Because each waveguide carries a light signals of a different wavelength, each attenuator is configured to attenuate the intensity of a different light signal.

During operation of the equalizer, a light beam having a plurality of light signals passes through the demultiplexer. The demultiplexer separates the beam into different light signals that are each carried by a waveguide. The attenuators are operated so as to attenuate the intensity the light signals such that each light signals has about the same intensity. The beam combiner re-combines the light signals into a beam. Each of the light signals in the beam has about the same intensity.

The demultiplexer and the beam combiner can each include two star couplers. As a result, the equalizer can include a total of four star couplers. Star couplers are often large and occupy a large portion of the space available on an optical chip. Additionally, the use of four connected star couplers is associated with high levels of optical loss. As a result, there is a need for an equalizer having a reduced size and/or reduced optical loss.

SUMMARY OF THE INVENTION

The invention relates to an equalizer. The equalizer includes a light distributor configured to distribute light signals received through an inlet side across an outlet side. Each of the light signals is associated with a different wavelength. The equalizer also includes optics configured to cause different light signals to separate as the light signals travel through the light distributor. The equalizer also includes a plurality of attenuators configured to attenuate the light signals in a region of the light distributor where the light signals are separated from one another.

Another embodiment of the equalizer includes optics configured to separate a beam of light into light signals of different wavelengths. The equalizer includes a plurality of attenuators configured to attenuate the light signals after separation of the light signals. At least one of the attenuators is configured to attenuate a plurality of the light signals.

The invention also relates to a method of operating an equalizer. The method includes separating a light beam into a plurality of light signals of different wavelengths. The method also includes employing a plurality of attenuators so as to attenuate the intensity of the light signals. At least one of the attenuators is employed so as to attenuate a plurality of the light signals.

BRIEF DESCRIPTION OF THE FIGURES

FIG. 3A is a top view of an optical component having an equalizer with a functional light distributor. The optical component includes a light transmitting medium positioned on a base.

FIG. 3B is a cross section of the optical component shown in FIG. 3A taken at any of the lines labeled A.

FIG. 3C is a cross section of the optical component shown in FIG. 3A taken at any of the lines labeled B.

FIG. 6A through FIG. 6F illustrate suitable constructions of bases that are suitable for use with optical components constructed according to FIG. 3A through FIG. 3F.

DETAILED DESCRIPTION

The invention relates to en equalizer. The equalizer includes a functional light distributor having a plurality of inlet ports and a plurality of outlet port. Light signals entering the light distributor through the inlet ports travel through the light distributor and are distributed across the outlet ports. As the light signals travel through the functional light distributor, the light signals are separated according to wavelength.

A plurality of attenuators are positioned so as to attenuate the light signals as the light signals travel through the light distributor. In some instances, the attenuators are each positioned so as to attenuate the light signals in the region of the light distributor where the light signals are separated from one another. As a result, each attenuator attenuates a particular light signal as the light signal travels through the light distributor. The attenuators can be operated to attenuate each light signal to about the same intensity level. As a result, the equalizer can provide a beam of light signals that each have about the same intensity.

As described above, the light distributor separates the light signals, attenuates the light signals and re-combines the light signals. In prior equalizers, these functions were provided by a combination of optical components that included a plurality of star couplers connected by a plurality of waveguides. Because, these functions are performed by a single component, the current equalizer is more compact than prior equalizers and is associated with reduced optical loss.

In one embodiment of the equalizer, one or more of the attenuators is configured to attenuate a plurality of the light signals. As a result, the equalizer employs a reduced number of attenuators. Reducing the number of attenuators reduces the complexity and costs associated with the fabricating and operating the equalizer.

Figure 1A:
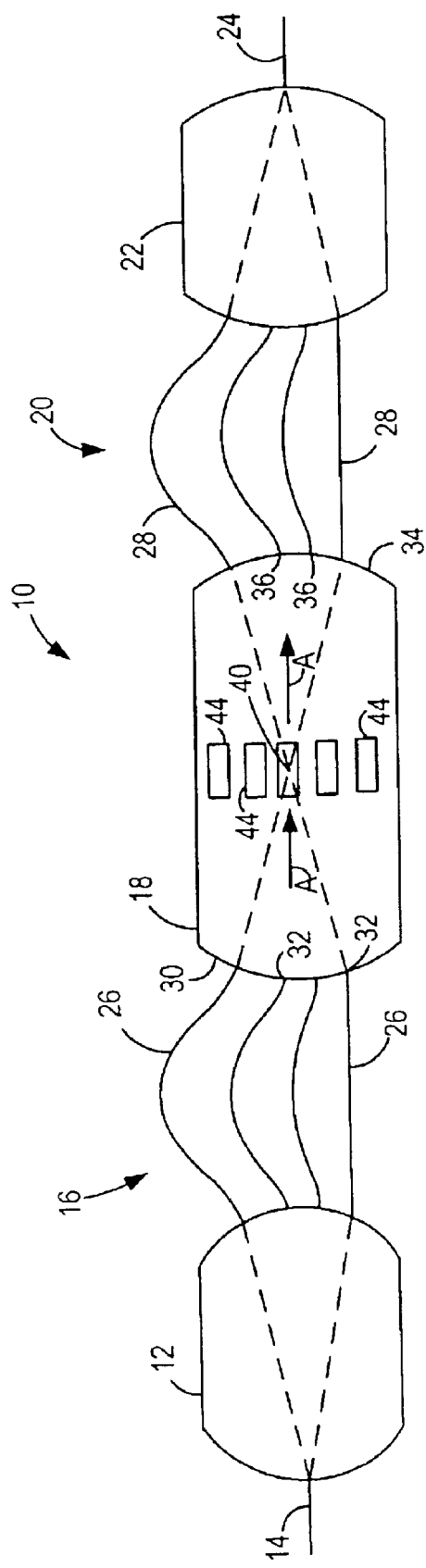
FIG. 1A illustrates an equalizer having a functional distributor configured to separate light signals according to wavelength.

FIG. 1A is a schematic diagram of an equalizer 10. The equalizer 10 includes an input light distributor 12 in optical communication with an input waveguide 14. A first array waveguide grating 16 provides optical communication between the input light distributor 12 and a functional light distributor 18. A second array waveguide grating 20 provides optical communication between the functional light distributor 18 and an output light distributor 22. The output light distributor 22 is in optical communication with an output waveguide 24. Suitable input light distributors 12 and/or a suitable output light distributors 22 include, but are not limited to, star couplers, Rowland circles, slab waveguides, free space and multi-mode devices. Suitable functional light distributors 18 include, but are not limited to, slab waveguides, free space and multi-mode devices, cascaded or tandem Rowland circles.

The first array waveguide grating 16 includes a plurality of first array waveguides 26 and the second array waveguide grating includes a plurality of second array waveguides 28. The first array waveguides 26 each have a different length. The difference in the length of adjacent first array waveguides 26, $\Delta L1$, is a constant. The second array waveguides 28 also have a different length. The difference in the length of adjacent second array waveguides 28, $\Delta L2$, is also a constant. The value of $\Delta L2$ can be the same as $\Delta L1$ or different from $\Delta L2$.

The functional region includes an inlet side 30 including a plurality of inlet ports 32 and an outlet side 34 including a plurality of outlet ports 36. Suitable shapes for the inlet side 30 and/or the outlet side 34 include, but are not limited to, the shape of a star coupler and a Rowland circle. In some instances, Equation 1 can be used to approximate suitable dimensions of the functional light distributor 18 where $d_1$ is the grating pitch at the inlet side 30, $d_2$ is the grating pitch at the outlet side 34, $R_1$ is the radius of curvature of the inlet side 30, and $R_2$ is the radius of curvature of the outlet side 34. The maximum distance between the inlet side and the outlet side is $R_1+R_2$. As a result, the values of $R_1+R_2$ can be selected to achieve a functional light distributor having particular dimensions or to shift the location of the focal points toward the inlet side or toward the outlet side.

$$\frac{d_1}{R_1 \Delta L_1} = \frac{d_2}{R_2 \Delta L_2} \quad .1$$

The dashed line illustrated in FIG. 1A shows the path that a light signal travels through the equalizer 10. The lines labeled A show the path of the central ray of the light signal through the functional light distributor 18. The light signal enters the input light distributor 12 from the input waveguide 14. The input light distributor 12 distributes the light signal to a plurality of the array waveguides. The light signal travels through the first array waveguide grating 16 and enters the functional light distributor 18 through the inlet ports 32. The shape of the inlet side 30 causes the light signal to contract to a focal point 40 located between the inlet side 30 and the outlet side 34. The distance between the inlet side 30 and the outlet side 34 allows the light signal to expand such that the light signals is distributed across the outlet ports 36. The second array waveguides 28 carry the light signal to the output light distributor 22. The output light distributor 22 contracts the light signals onto the output waveguide 24.

Figure 1B:
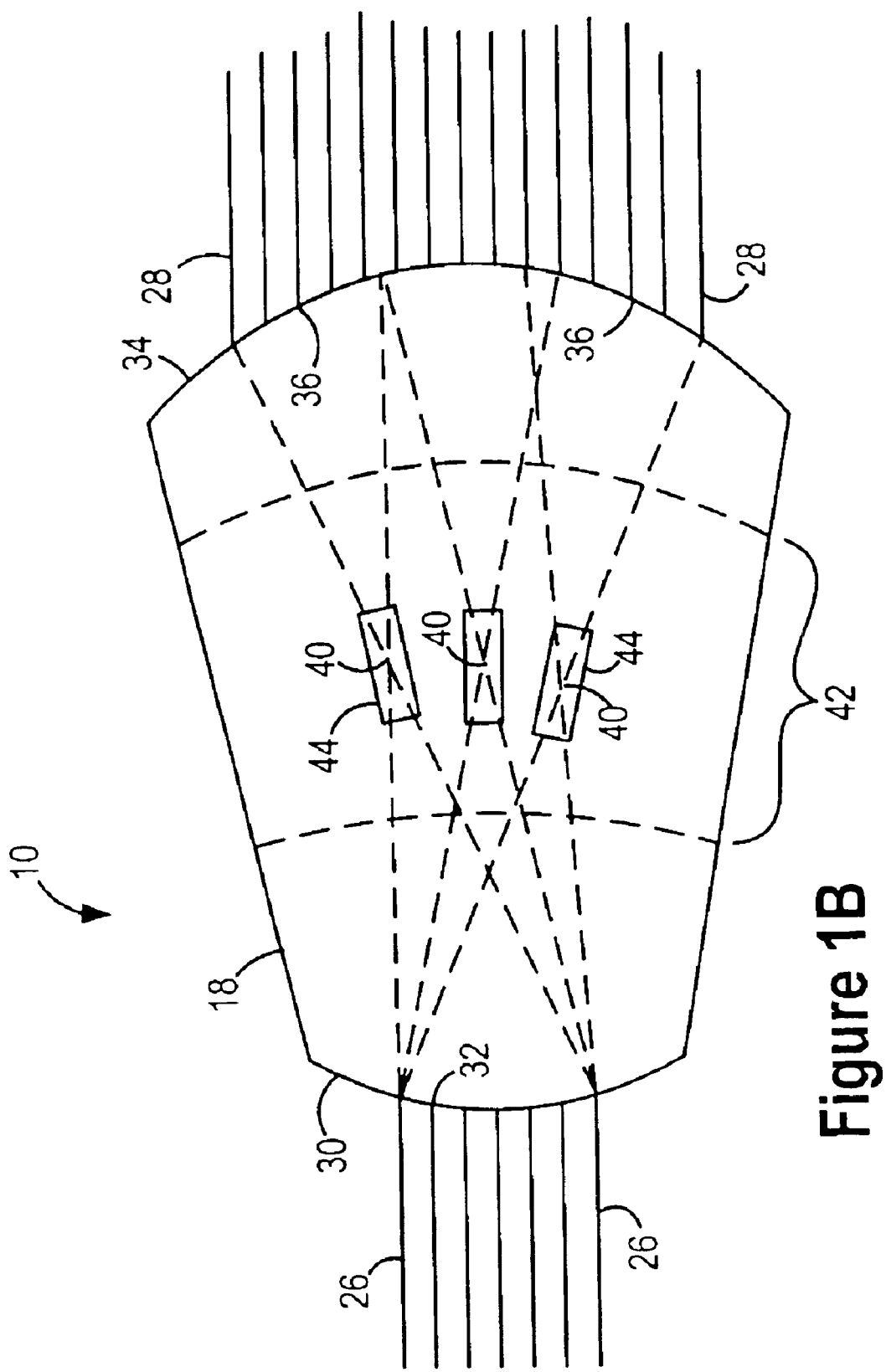
FIG. 1B illustrates the path of a plurality of light signals through a functional light distributor.

Although operation of the equalizer 10 is described above in the context of a single light signal, the equalizer 10 is generally employed in conjunction with a beam of light having a plurality of light signals having a range from about 1529 nm to 1562 nm (C-band), L-band, S-band or other bands. The first array waveguide grating 16 serves as separation optics that cause different light signals to travel through the functional light distributor 18 along different paths. Because the difference in the length of adjacent first array waveguides 26, $\Delta L1$, is a constant, portions of a light signal entering the functional light distributor 18 from different first array waveguides 26 enter the functional light distributor 18 in different phases. Additionally, the amount of this phase differential is different for different light signals because the value of $\Delta L1$ is a different fraction of the wavelength for different light signals. As a result, different light signals contract to different locations in the functional light distributor 18. For instance, FIG. 1B illustrates the path that three light signals travel through a functional light distributor 18. The location of the focal point 40 is different for different light signals. The region of the functional light distributor 18 where the light signals are separated from one another is the separation region 42 of the functional light distributor 18.

As evident in FIG. 1B, different light signals diverge as they travel across the functional region. The portion of the outlet side 34 having outlet ports 36 can be larger than the portion of inlet side 30 having inlet ports 32 to compensate for the divergence of the light signals and/or to provide sufficient power collection. The grating pitch of the inlet ports 32 can be the same as or different from the grating pitch of the outlet ports 36. When the portion of the outlet side 34 having outlet ports 36 is larger than the inlet side 30 and the grating pith of the inlets ports matches the grating pitch of the outlet ports 36, the number of outlet ports 36 in the outlet side 34 will exceed the number of inlet ports 32 in the inlet side 30. As a result, in some instances, the number of second array waveguides 28 exceeds the number of first array waveguides 26.

After traveling through the separation region 42, the separated light signals re-combine and are incident on the outlet side 34. Because of the difference in the length of adjacent first array waveguides 26, ΔL1, the portions of each light signal entering different outlet ports 36 are out of phase with one another. The second array waveguide grating 20 is configured to compensate for this phase differential. More specifically, the difference in the length of adjacent second array waveguides 28, ΔL2, is selected such that the portions of each light signal entering the output light distributor 22 from different second array waveguides 28 are in phase with one another. Because the portions of each light signal enter the output light distributor 22 in phase, each light signal is directed toward the output waveguide 24. As a result, the output waveguide 24 carries a beam of light having each of the light signals present in the input waveguide 14. A suitable value for the length of adjacent second array waveguides 28, ΔL2, is the value of the length of adjacent first array waveguides 26, ΔL1.

Figure 1C:
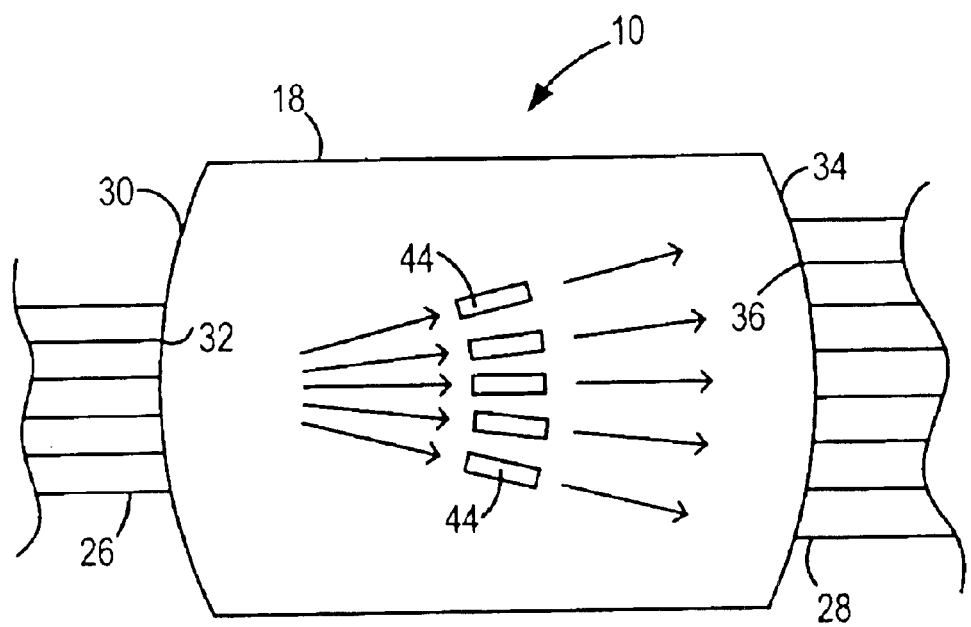
FIG. 1C illustrates a functional light distributor having a plurality of attenuators that are each configured to attenuate a single light signal traveling through the functional light distributor.

The equalizer 10 includes a plurality of attenuators 44 in communication with electronics for controlling the equalizer 10. The attenuators 44 are positioned so as to attenuate the light signals as the light signals pass through the separation region 42. For instance, FIG. 1C illustrates the path of the central ray of five different light signals. Each attenuator 44 can has a size and position that allows the attenuator 44 to attenuate a particular light signal as the light signal passes through the separation region 42. As a result, the electronics can be operated so as to control the degree of attenuation the will occur to each light signal.

Figure 1D:
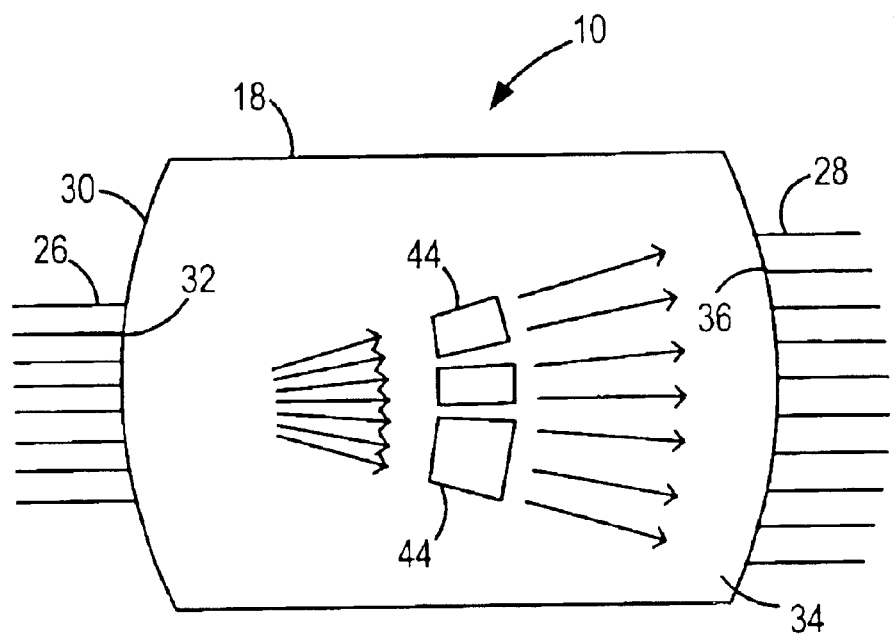
FIG. 1D illustrates a functional light distributor having a plurality of attenuators that are each configured to attenuate a plurality of light signals traveling through the functional light distributor.

As an alternative to independent attenuation of each light signal, one or more of the attenuators 44 can be sized and positioned so as to concurrently attenuate a plurality of light signals as illustrated in FIG. 1D. Although the one or more attenuators 44 configured to attenuate a plurality of light signals can be configured to attenuate light signals as they pass through the separation region 42, all or a portion of these attenuators 44 can also be configured to attenuate light signals outside of the separation region 42. When one or more attenuators 44 are configured to attenuate a plurality of light signals, a reduced number of attenuators 44 are required. Reducing the number of attenuators 44 reduces the complexity and costs associated with the equalizer 10.

Figure 2A:
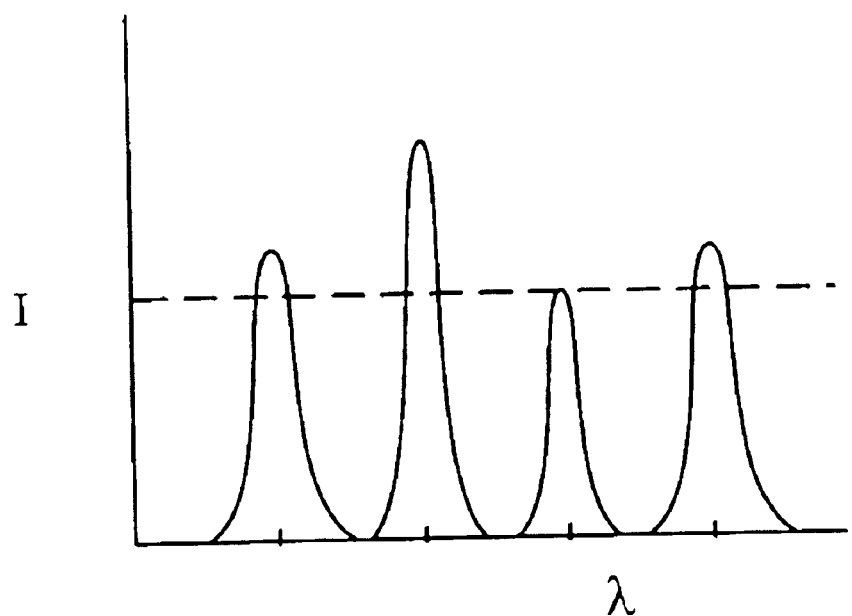
FIG. 2A illustrates the intensity versus wavelength profile of a plurality of light signals before attenuation by attenuators configured to attenuate a single light signal.
Figure 2B:
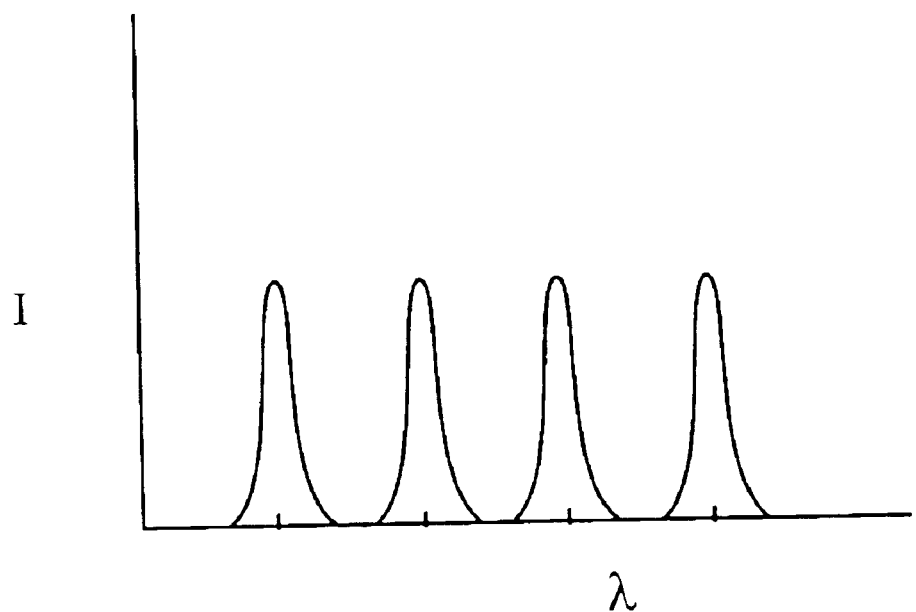
FIG. 2B illustrates the intensity versus wavelength profile for the light signals of FIG. 2A after attenuation.

When each attenuator 44 is configured to attenuate a single light signal, the electronics can be operated so as to attenuate the intensity of each light signal to a target intensity. For instance, FIG. 2A illustrates the intensity of the light signals in the input before being attenuated while FIG. 2B illustrates the intensity of the light signals after being attenuated. The attenuators 44 are operated so as to attenuate the light signals to the target intensity. As a result, the light signals carried in the output waveguide 24 have about the same intensity. In some instances, the target intensity is the intensity of the light signal having the lowest intensity before attenuation. Alternatively, the target intensity can be less than the intensity of the light signal having the lowest intensity before attenuation. Although FIG. 2A and FIG. 2B illustrate the light signals attenuated to the same target intensity, the electronics can be operated so different light signals are attenuated to different intensities.

Figure 2C:
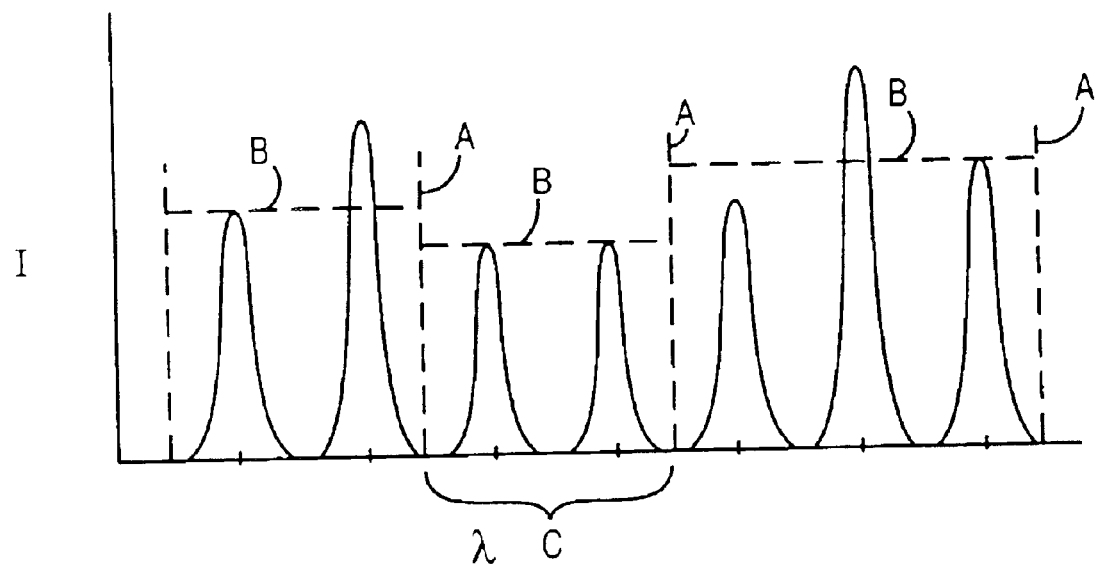
FIG. 2C illustrates the intensity versus wavelength profile of a plurality of light signals before attenuation by attenuators configured to attenuate a plurality of light signals.
Figure 2D:
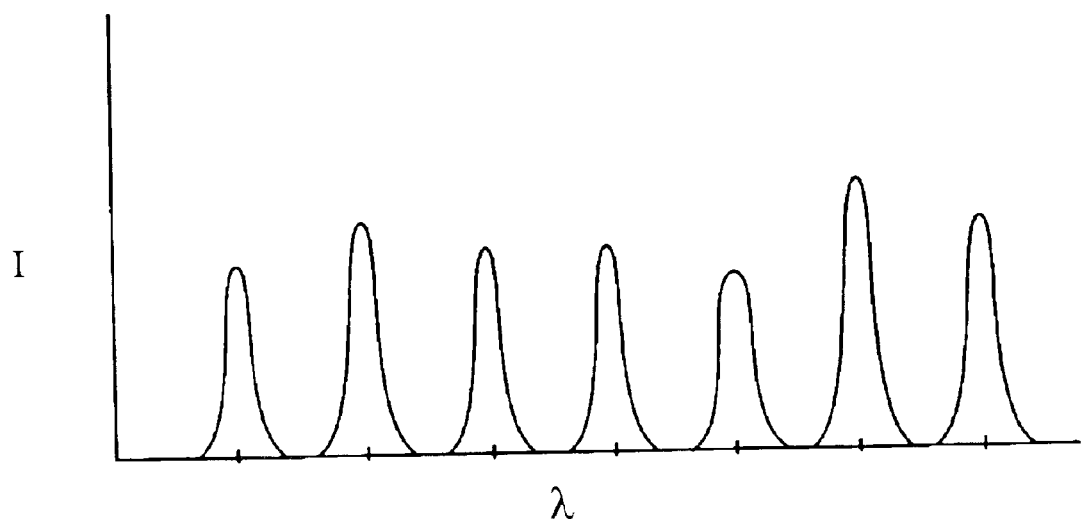
FIG. 2D illustrates the intensity versus wavelength profile for the light signals of FIG. 2C after attenuation.

When one or more attenuators 44 is configured a plurality of light signals, the electronics can be operated so as to attenuate each group of light signals to about the same intensity. For instance, FIG. 2C illustrates the intensity of light signals before being attenuated while FIG. 2D illustrates the intensity of the light signals after being attenuated. The lines labeled A denote groups of light signals. For instance, the light signals located between two lines labeled A belong to a group of light signals. The light signals in a group can be attenuated by a single attenuator 44.

The light signals in each group can be attenuated to a target level. In some instances, the target intensity is the average intensity of the group having the lowest average intensity before attenuation. For instance, the lines labeled B in FIG. 2C illustrates the average intensity for each group. The group having the lowest average intensity is labeled C. The average intensity of the group labeled C serves as the target intensity. As shown in FIG. 2D, the groups are attenuated such that the average intensity of each group is about the target intensity. Other target intensities are suitable for use with the equalizer 10. When the attenuators 44 are configured to attenuate more than one light signal, each of the light signals do not have the same intensity after attenuation as is evident in FIG. 2D. However, when an optical network includes more than one equalizer 10 and the grouping of light signals to be attenuated is different for different equalizers 10, the equalizers 10 will average out the intensity of different light signals to about the same intensity.

In some instances, the grouping of the light signals can be experimentally determined. For instance, light signals that are adjacent to one another in the separation region 42 and having similar intensities can be included in the same group. In this arrangement, each of the light signals is attenuated to about the same intensity. Other methods for assigning light signal groups can be employed. For instance, the attenuators 44 can be arranged such that each attenuator 44 is configured to attenuate a particular number of light signals. Suitable numbers of light signals to be attenuated by a single attenuator 44 include, but are not limited to, 1, 2 or more, 4 or more and 8 or more and different combinations. In some instance, the equalizer is in optical communication with an optical amplifier. The gain of an optical amplifier is typically not flat over the response of the amplifier. As a result, different levels of gain are applied to different light signals. The attenuators can be arranged such that light signals that are adjacent to one another in the separation region and having similar gain levels fall in the same group.

FIG. 3A through FIG. 3C illustrates a suitable construction of an optical component 50 having an equalizer 10. FIG. 3A is a top view of a portion of an optical component 50 having an equalizer 10. The illustrated portion of the optical component 50 includes an input waveguide 14, an input light distributor 12, a first array waveguide grating 16 and a functional light distributor 18. FIG. 3B is a cross section of the optical component 50 in FIG. 3B taken at any of the lines labeled A. FIG. 3C is a cross section of the optical component 50 in FIG. 3B taken at any of the lines labeled B.

The optical component 50 includes a light transmitting medium 52 positioned over a base 54. The light transmitting medium 52 includes a ridge 56 that defines a portion of the light signal carrying region 58 of a waveguide. Suitable light transmitting media include, but are not limited to, silicon, polymers and silica, GaAs, InP, SiN, SiC, SiGe, LiNbO$_3$.

The base 54 is designed such that the portion of the base 54 adjacent to the light signal carrying region 58 reflects light signals from the light signal carrying region 58 back into the light signal carrying region 58. As a result, the base also defines a portion of the light signal carrying region 58. The line labeled E illustrates the profile of a light signal carried in the light signal carrying region 58 of FIG. 3B.

Figure 3D:
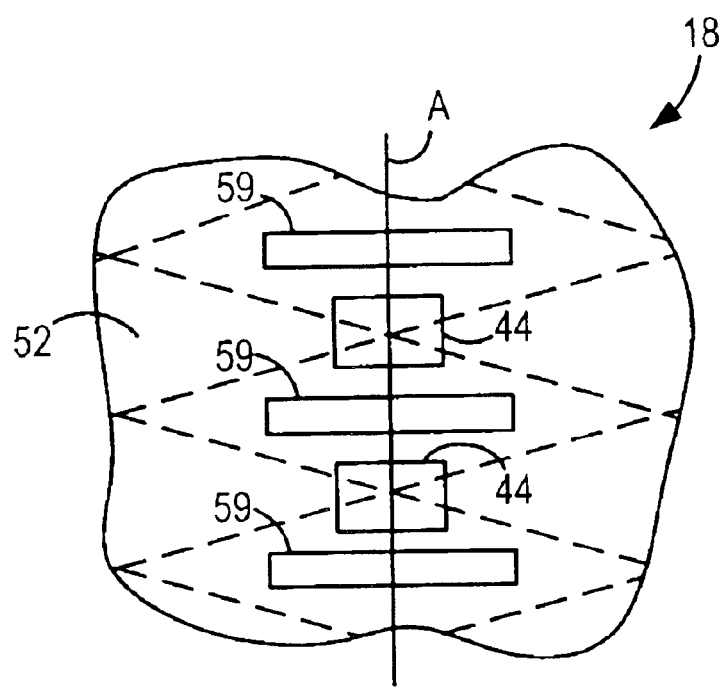
FIG. 3D is a top view of an optical component having an equalizer with a functional light distributor. The functional light distributor includes grooves formed between adjacent attenuators.
Figure 3E:
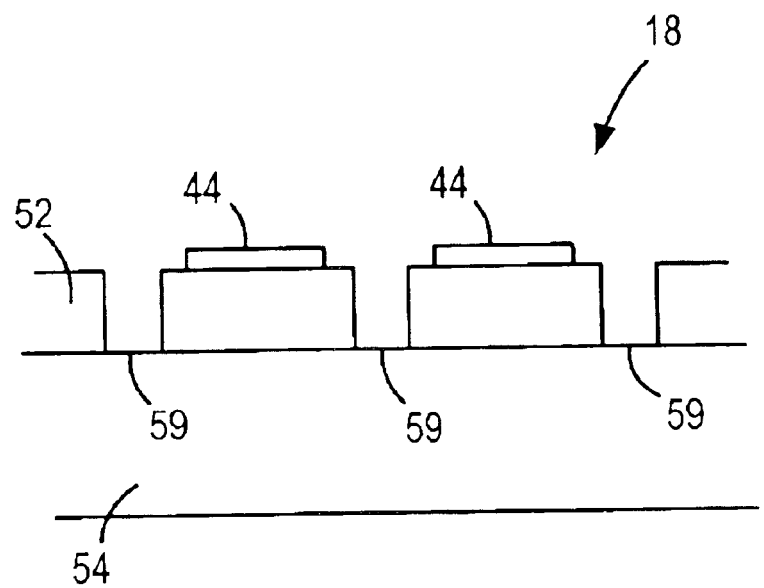
FIG. 3E is a cross section of the component shown in FIG. 3D taken at the line labeled A.

The functional light distributor 18 can include grooves 59 positioned between adjacent attenuators 44 as illustrated in FIG. 3D and FIG. 3E. FIG. 3D is a top view of a portion of the functional light distributor 18 having two attenuators 44. FIG. 3E is a cross section of the functional light distributor 18 shown in FIG. 3D taken at the line labeled A. The dashed lines show the path of light signals through the functional light distributor 18.

The grooves 59 can be positioned adjacent to the attenuators 44. For instance, a groove 59 can be formed between adjacent attenuators 44 and/or between an attenuator 44 and a side of the functional light distributor 18. The grooves 18 can be positioned outside of the light signal paths to reduce undesired reflection of the light signals. As will be discussed in more detail below, a variety of attenuator 44 constructions are possible. The grooves 59 can serve to reduce the effects of one attenuator 44 on the performance of adjacent attenuators 44 or on adjacent light signals. Further, the grooves 59 can reduce the cross talk between adjacent light signals.

Although the grooves 59 are shown as extending through the light transmitting medium 52, the grooves can extend part way into the light transmitting medium 52 or can extend into the base 54.

Figure 4A:
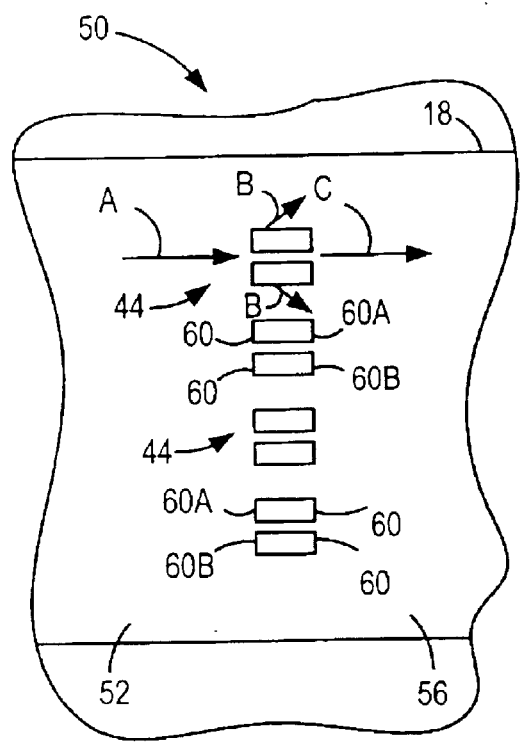
FIG. 4A through FIG. 4F illustrate construction of an attenuator that is suitable for use with functional light distributors constructed according to FIG. 3A through FIG. 3D.
Figure 4B:
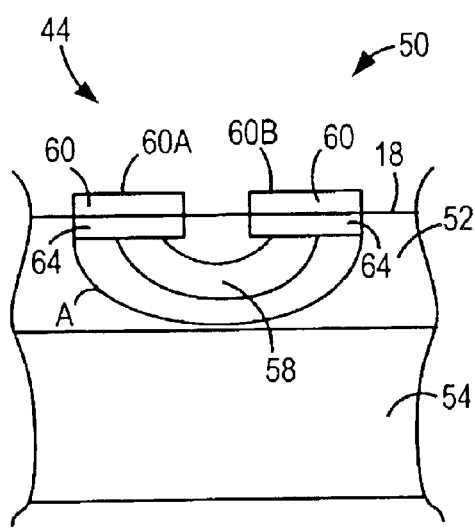

FIG. 4A and FIG. 4B illustrate an attenuator 44 that is suitable for use with an equalizer 10 constructed as shown in FIG. 3A through FIG. 3C. FIG. 4A is a top view of a portion of a functional light distributor 18 having a plurality of attenuators 44. FIG. 4B is a cross section of the functional light distributor 18 shown in FIG. 4A.

The attenuator 44 includes a first electrical contact 60A and a second electrical contact 60B positioned over the ridge 56 of the functional light distributor 18. Suitable metals for the electrical contacts 60 include, but are not limited to, Ni, Cr, Ti, Tungsten, Au, Ct, Pt, Al and/or their silicides. The electrical contacts 60 can be formed to a thickness greater than 0.1 $\mu$m, 0.5 $\mu$m, 1 $\mu$m, 1.5 $\mu$m or 2 $\mu$m or to a thickness less than 4 $\mu$m. Electrical conductors such as wires can optionally be connected to the electrical contacts 60 to provide electrical communication between the electronics and the electrical contacts 60.

A doped region 64 is formed adjacent to each of the electrical contacts 60. The doped regions 64 can be N-type material or P-type material. When one doped region 64 is an N-type material, the other doped region 64 is a P-type material. For instance, the doped region 64 adjacent to the first electrical contact 60A can be a P type material while the material adjacent to the second electrical contact 60B can be an N type material. In some instances, the doped regions 64 of N type material and/or P type material are formed to a concentration of $10^{\wedge}(17-21)/cm^3$ at a thickness of less than 6 $\mu$m, 4 $\mu$m, 2 $\mu$m, 1 $\mu$m or 0.5 $\mu$m.

FIG. 4A and FIG. 4B illustrate operation of the attenuator 44. During operation of the attenuator 44, a potential is applied between the electrical contacts 60. The potential causes the index of refraction of the first light transmitting medium 52 positioned between the electrical contacts 60 to change as shown by the lines labeled A in FIG. 4B. When the potential on the electrical contact adjacent to the P-type material is less than the potential element on the electrical contact adjacent to the N-type material, a current flows through the light transmitting medium 52 and the index of refraction decreases.

The line labeled A in FIG. 4A illustrates a light signal traveling toward the attenuator 44. When the attenuator 44 is operated so as to reduce the index of refraction of the light signal carrying region 58, the drop in the index of refraction causes at least a portion of the light signals to be reflected out of the light signal carrying region 58 as illustrated by the lines labeled B. Because a portion of the light signals is reflected out of the light signal carrying region 58, the portion of the light signal exiting the attenuator 44 has a reduced intensity as illustrated by the arrow labeled C. In some instances, when the refractive index drops, optical absorption caused by carrier injection/depletion can occur at the same time. For example, when the light transmitting medium is silicon an efficient method of reducing the index of refraction is by carrier injection from the PN junction.

Increasing the potential applied between the electrical contacts 60 increases drop in the index of refraction. The increased drop increases the portion of the light signal that is reflected by the attenuator 44. As a result, the increased potential increases the level of attenuation.

Figure 4C:
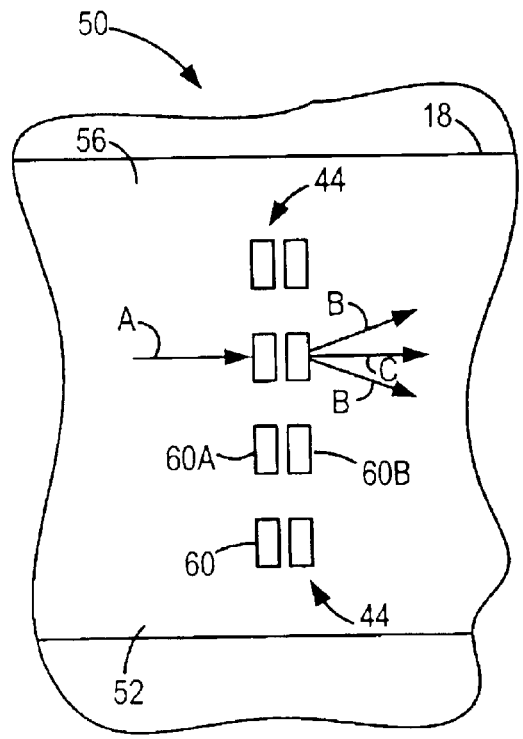

The electrical contacts 60 can be positioned in other orientations relative to the direction of propagation of the light signals through the functional light distributor 18. For instance, FIG. 4C illustrates the electrical contacts 60 turned ninety degrees from the electrical contacts 60 of FIG. 4A. The arrangement of electrical contacts 60 illustrated in FIG. 4C can reduce the level of interference between adjacent attenuators 44.

Figure 4D:
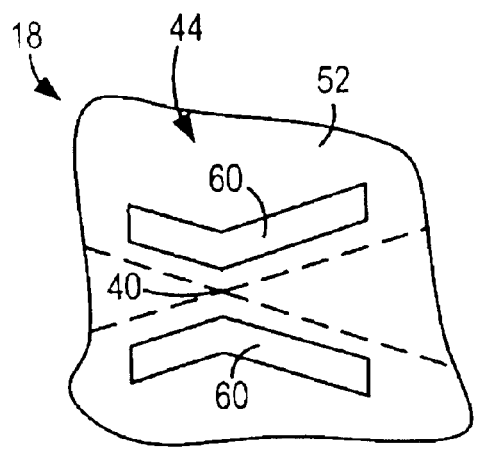

Although FIG. 4A through FIG. 4C show the electrical contacts 60 having substantially rectangular shapes, the electrical contacts 60 can have a variety of different shapes. For instance, the electrical contacts 60 can be contoured to match the contour of the light signal path in the separation region 42 as shown in FIG. 4D. FIG. 4D is a top view of a portion of a functional light distributor 18 having the focal point 40 of a light signal. The dashed line illustrates the path of the light signal through the functional light distributor 18. The first electrical contact 60A and the second electrical contact 60B are positioned on opposing sides of the light signal path and have a shape that is complementary to the shape of the light signal path. Increasing the length of the electrical contacts 60 provides an increased level of attenuation. Matching the contour of the electrical contacts 60 to the light signal path can increase the attenuation efficiency.

Figure 4E:
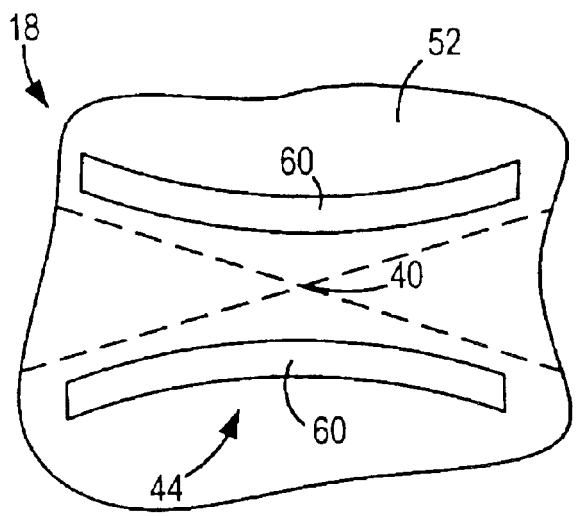
Figure 4F:
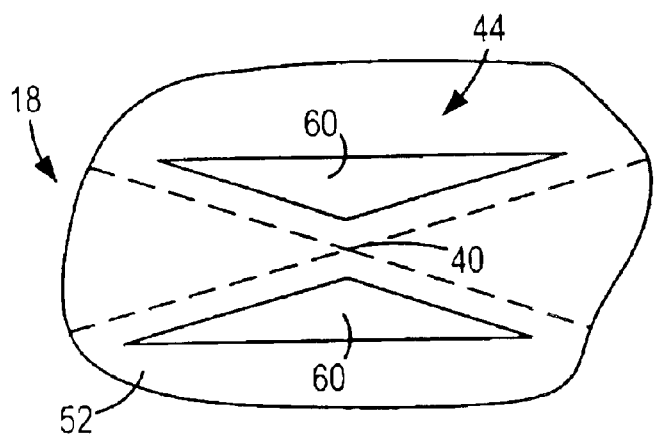

Although FIG. 4D illustrates the electrical contacts 60 as having a straight contour, the electrical contacts 60 can have a curved contour as illustrated in FIG. 4E. A suitable curved contour includes, but is not limited to, a portion of a Gaussian profile. Further, the width of the electrical contacts 60 need not be constant along the length of the electrical contacts 60 as illustrated in FIG. 4F.

Figure 5A:
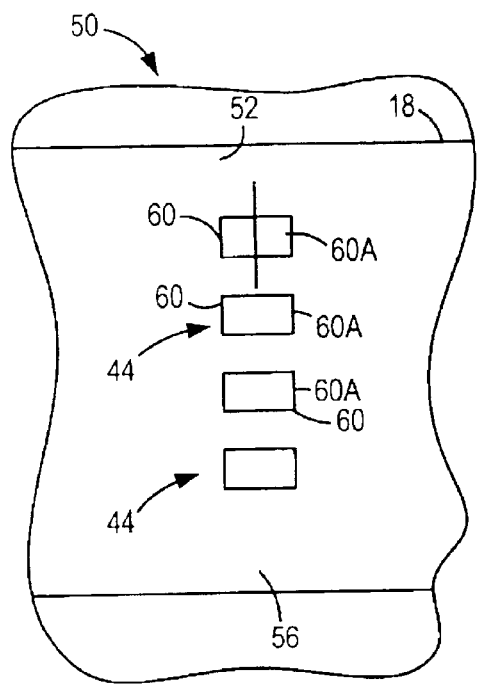
FIG. 5A through FIG. 5D illustrate construction of another attenuator that is suitable for use with functional light distributors constructed according to FIG. 3A through FIG. 3D.
Figure 5B:
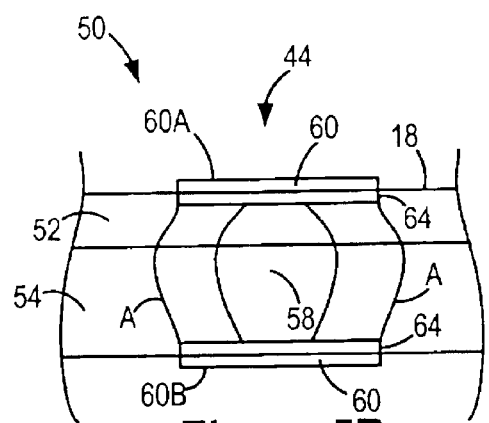

FIG. 5A and FIG. 5B illustrate another embodiment of an attenuator 44 suitable for use with an equalizer 10 constructed as shown in FIG. 3A through FIG. 3C. FIG. 5A is a top view of a portion of a functional light distributor 18 having a plurality of attenuators 44. FIG. 5B is a cross section of the functional light distributor 18 shown in FIG. 5A.

The attenuator 44 includes a first electrical contact 60A and a second electrical contact 60B positioned on opposing sides of the optical component 50. Suitable metals for the electrical contacts 60 include, but are not limited to, Ni, Cr, Ti, Tungsten, Au, Ct, Pt, Al and/or their silicides. The electrical contacts 60 can be formed to a thickness greater than 0.1 $\mu$m, 0.5 $\mu$m, 1 $\mu$m, 1.5 $\mu$m or 2 $\mu$m. Electrical conductors such as wires can optionally be connected to the electrical contacts 60 to provide electrical communication between the electronics and the electrical contacts 60.

A doped region 64 is formed adjacent to each of the electrical contacts 60. The doped regions 64 can be N-type material or P-type material. When one doped region 64 is an N-type material, the other doped region 64 is a P-type material. For instance, the doped region 64 adjacent to the first electrical contact 60A can be a P type material while the material adjacent to the second electrical contact 60B can be an N type material. In some instances, the regions of N type material and/or P type material are formed to a concentration of $10^{\wedge}(17-21)/cm^3$ at a thickness of less than 6 μm, 4 μm, 2 μm, 1 μm or 0.5 μm.

During operation of the attenuator 44, a potential is applied between the electrical contacts 60. The potential causes the index of refraction of the first light transmitting medium 52 positioned between the electrical contacts 60 to change as shown by the lines labeled A in FIG. 5B. When the potential on the electrical contact adjacent to the P-type material is less than the potential element on the electrical contact adjacent to the N-type material, a current flows through the light transmitting medium 52 and the index of refraction decreases. The drop in the index of refraction causes a portion of a light signal traveling through the light signal carrying region 58 affected by the attenuator 44 to be diverted from the light signal carrying region 58. Optical absorption can also occur as is associated with silicon.

Figure 5C:
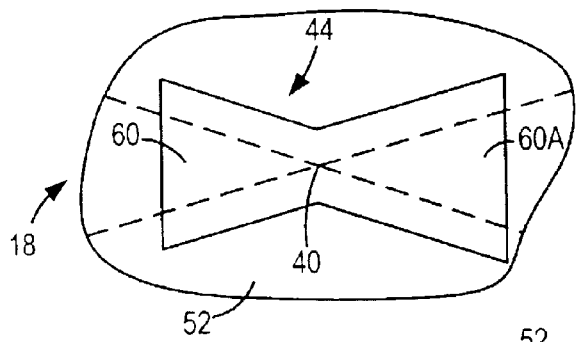
Figure 5D:
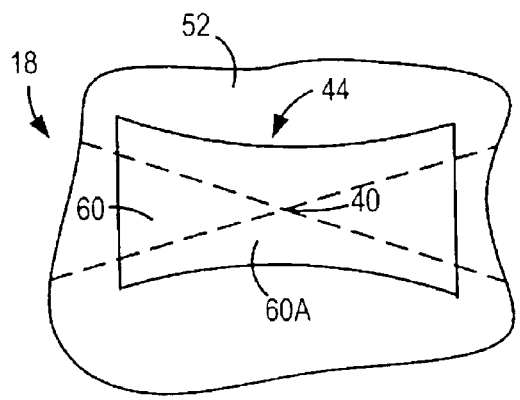

Although FIG. 5A and FIG. 5B show the electrical contacts 60 having substantially rectangular shapes, the electrical contacts 60 can have a variety of different shapes. For instance, the electrical contacts 60 can be contoured to match the contour of the light signal in the separation region 42 as shown in FIG. 5C. FIG. 5C is a top view of a portion of a functional light distributor 18 having the focal point 40 of a light signal. The dashed line illustrates the path of the light signal through the functional light distributor 18. The first electrical contact 60A has a shape that is complementary to the shape of the light signal path. Although not shown, the second electrical contact 60B can also have a shape that is complementary to the shape of the light signal path or can have shape that is different from the first electrical contact. Increasing the length of the electrical contacts 60 provides an increased level of attenuation. Matching the contour of the electrical contacts 60 to the light signal path can increase the attenuation efficiency.

Although FIG. 4D illustrates the electrical contacts 60 as having a straight contour, the electrical contacts can have a curved contour as illustrated in FIG. 4E. A suitable curved contour includes, but is not limited to, a portion of a Gaussian profile.

The arrangement of the attenuator 44 on the functional light distributor 18 can affect the attenuation efficiency associated with an attenuator 44. Increasing the efficiency of an attenuator 44 increases the portion of a light signal that is attenuated per amount of power applied to the attenuator 44. The efficiency of the attenuators 44 illustrated in FIG. 4A through FIG. 5D increases as the proximity of the index of refraction change approaches the position of the focal point 40 of the light signal(s) to be attenuated. Accordingly, the attenuators 44 are most efficient when the electrical contacts 60 are positioned so as to change the index of refraction of the light transmitting medium 52 at the focal point 40 of the light signal(s) to be attenuated by attenuator 44. For instance, the electrical contacts 60 of an attenuator 44 can be arranged such that the focal point 40 of a light signal to be attenuated is positioned between the electrical contacts 60.

The number of light signals attenuated by an attenuator 44 according to FIG. 4A through FIG. 5B is controlled by the location of the change in the index of refraction. For instance, an attenuator 44 can be configured to attenuate a single light signal when the electrical contacts 60 are positioned such that the change in the index of refraction can be limited to the path of the light signal to be attenuated. Further, the an attenuator 44 can be configured to attenuate a plurality of light signals when the electrical contacts 60 are positioned such that the change in the index of refraction occurs in the path of a plurality of light signals.

Figure 6A:
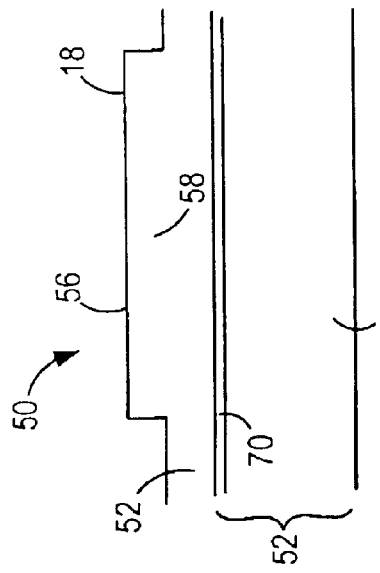
Figure 6B:
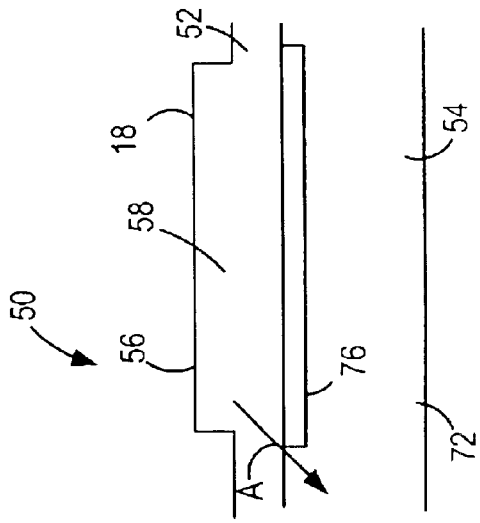

The base 54 can have a variety of suitable constructions. FIG. 6A and FIG. 6B illustrate a base 54 having a light barrier 70 positioned over a substrate 72. FIG. 6A is a cross section of a waveguide and FIG. 6B is a cross section of the functional light distributor 18. The light barrier 70 is selected to reflect light signals from the light signal carrying region 58 back into the light signal carrying region 58. A suitable material for the substrate 72 and light transmitting medium 52 includes, but is not limited to, silicon. A suitable light barrier 70 includes, but is not limited to, silica.

A silicon on insulator wafer can be employed to fabricate an equalizer 10 according to FIG. 6A and FIG. 6B. A silicon on insulator wafer typically includes a layer of silica positioned between a lower silicon layer and an upper silicon layer. The lower silicon layer serves as the substrate 72; the silica serves as the light barrier 70; and the upper silicon layer serves as the light transmitting medium 52. The upper silicon layer can be masked and etched so as to form the ridge 56 in the upper silicon layer. The doped regions 64 can be formed at the desired locations using techniques such as impurity diffusion or masking and implantation. The electrical contacts 60 are formed over the doped regions 64. Mask and etch techniques can optionally be employed to form grooves at the desired locations in the light transmitting medium.

Figure 6C:
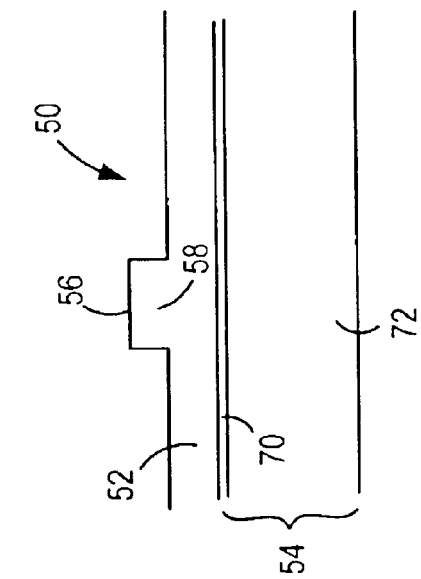
Figure 6D:
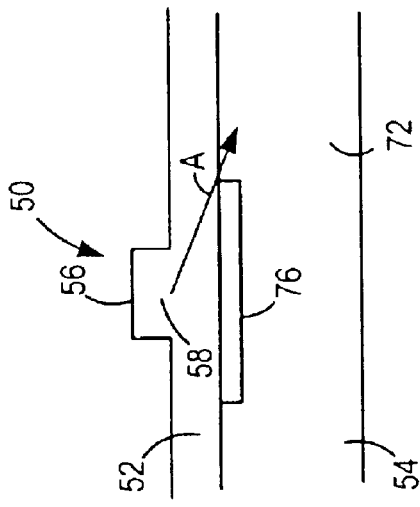

FIG. 6C and FIG. 6D illustrate another embodiment of a suitable base 54. FIG. 6C is a cross section of a waveguide and FIG. 6D is a cross section of the functional light distributor 18. The base 54 includes a substrate 72 having a pocket 76. The ridge 56 is positioned over the pocket 76. The pocket 76 contains a material configured to reflect a light signal from the light signal carrying region 58 back into the light signal carrying region 58. Suitable materials for the substrate 72 include but are not limited to, silicon. Suitable materials for containing in the pocket 76 include, but are not limited to, gasses such as air.

The substrate 72 can be selected such that light can be drained from the light transmitting medium 52 into the substrate 72 as illustrated by the arrow labeled A. As a result, portions of a light signal driven out of the light signal carrying region 58 by attenuation are drained away from the light signal carrying regions 58. Because the attenuated light signals are drained away from the light signal carrying regions 58, the attenuated light signals do not act as source of cross talk by entering into other light signal carrying regions 58. A suitable method of achieving the drain effect is to select the substrate 72 so as to have an index of refraction greater than or equal to the index of refraction of the light transmitting medium 52. This selection of materials reduces reflection that occurs at the intersection of the substrate 72 and the light transmitting medium 52. In some instances, the substrate 72 and the light transmitting medium 52 are the same material.

The entire functional light distributor 18 can be constructed with the base 54 construction illustrated in FIG. 6D. FIG. 6E and FIG. 6F illustrate an alternative construction for the portion of the base 54 associated with the functional light distributor 18. FIG. 6E is a top view of a portion of an optical component 50 having a functional light distributor 18. The dashed line illustrates the location of the perimeter of the pocket 76. FIG. 6F is a cross section of the functional light distributor 18 shown in FIG. 6E taken at the line labeled A.

Although grooves 59 are not shown in the optical component illustrated in FIG. 6E and FIG. 6F, the addition of grooves 59 between adjacent attenuators 44 can serve to drive the attenuated portions of the light signal into the base 54.

The pocket 76 extends under some regions of the functional light distributor 18 while not extending under other regions of the functional light distributor 18. The pocket 76 is not positioned under a portion of the regions of the light transmitting medium 52 where the light signals do not travel. For instance, the light signals do not travel between adjacent attenuators 44 as illustrated in more detail in FIG. 1B. The pocket 76 is not formed under the regions of the light transmitting medium adjacent to the attenuators. For instance, the pocket 76 is not positioned under the regions of the light transmitting medium 52 adjacent to the attenuators 44. As a result, the light transmitting medium 52 contacts the base 54 at regions of the light transmitting medium 52 located adjacent to the attenuator 54. The contact between the light transmitting medium 52 and the base 54 allows attenuated portions of a light signal 1 to be drained out of the light transmitting medium 52 as illustrated by the arrows labeled A in FIG. 6F. As a result, the attenuated portions of the light signal are less likely to be a source of cross talk.

Figure 7A:
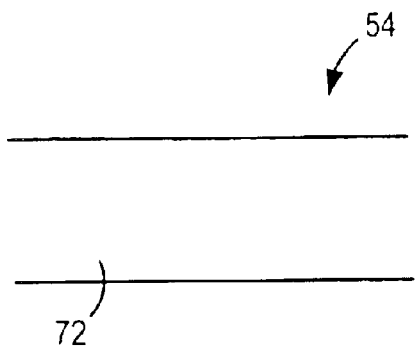
FIG. 7A through FIG. 7E illustrate a method of forming an optical component having a light transmitting medium positioned on a base.

FIG. 7A through FIG. 7E illustrate a method for fabricating an equalizer 10 according to FIG. 6C and FIG. 6D. FIG. 7A is a cross section of a base 54. A suitable base 54 includes, but is not limited to, a silicon substrate 72. Although the base 54 is shown as being constructed from a single material, the base 54 can have a composite construction or can be constructed with two or more layers of material.

Figure 7B:
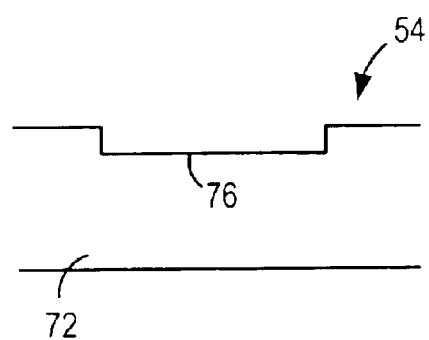

One or more pockets 76 are formed in the base 54 as illustrated in FIG. 7B. The one or more pockets 76 can be formed with a mask and an etch or other techniques. As illustrated above, the pocket 76 is positioned under the ridge(s) 56 that define the waveguides, light distributors and the functional light distributor 18. Accordingly, the pocket 76 is formed so the ridge(s) 56 can be formed over the pocket 76 in the desired pattern.

Figure 7C:
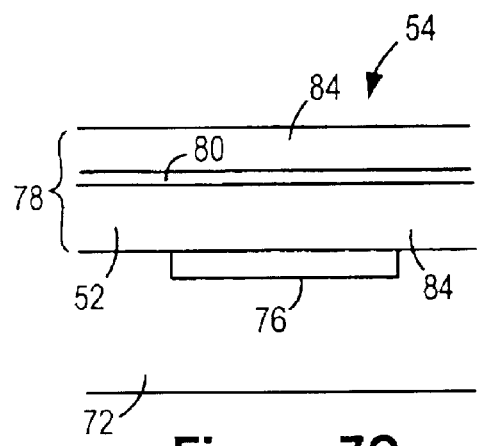
Figure 7D:
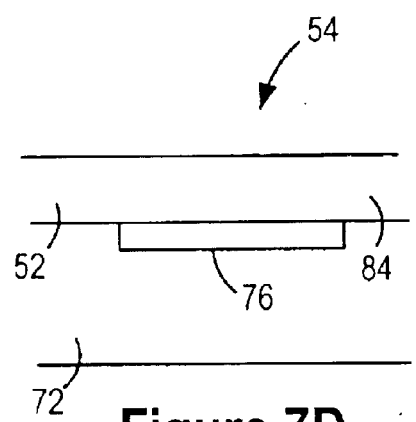
Figure 7E:
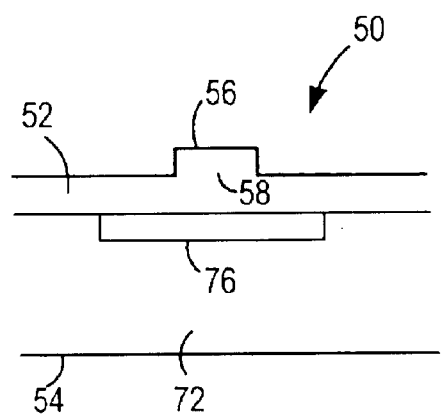

A light transmitting medium 52 is formed over the base 54. The light transmitting medium 52 can be deposited or grown on the base 54. Alternatively, wafer bonding techniques can be employed to bond the light transmitting medium 52 of a wafer 78 to the base 54. A suitable wafer 78 includes, but is not limited to, a silicon on insulator wafer. As noted above, a silicon on insulator wafer typically includes a layer of silica 80 positioned between a lower silicon layer 82 and an upper silicon layer 84. The upper silicon layer 84 can be bonded to the base 54 as shown in FIG. 7C. The lower silicon layer 82 and the layer of silica 80 can be removed to provide the optical component 50 precursor shown in FIG. 7D. Additionally, a portion of the upper silicon layer 84 can be removed to provide the upper silicon layer 84 with the desired thickness of the light transmitting medium 52. Suitable methods for removing the lower silicon layer 82, the layer of silica 80 and the upper silicon layer 84 include, but are not limited to, etching, buffing, polishing, lapping, detachment through H implantation and subsequent annealing. The light transmitting medium 52 can be masked and etched so as to form the ridge 56 in the light transmitting medium 52 as shown in FIG. 7E. The doped regions 64 can be formed at the desired locations using techniques such as impurity diffusion or masking and implantation. The electrical contacts 60 are formed over the doped regions 64. Mask and etch techniques can optionally be employed to form grooves at the desired locations in the light transmitting medium.

The methods described above include etching the light transmitting medium 52 so as to form a ridge 56 in the light transmitting medium 52. In order to reduce scattering of light signals, the etches should be selected so as to result in formation of smooth surfaces on the ridge 56. Suitable etches include, but are not limited to, the etches taught in U.S. patent application Ser. No. 09/845,093; filed on Apr. 27, 2001; entitled "Formation of an Optical Component Having Smooth Sidewalls" and U.S. patent application Ser. No. 09/690,959; filed on Oct. 16, 2000; entitled "Formation of a Vertical Smooth Surface on an Optical Component" each of which is incorporated herein in is entirety.

The optical components illustrated above are not necessarily proportional and the number of waveguides is not necessarily representative. For instance, the first array waveguide grating 16 is often shown with four first array waveguides 26 and the second array waveguide grating is often shown with four second array waveguides 28, however, array waveguide gratings often include a different number of array waveguides and can include as many as several tens or hundreds of array waveguides. Further, the equalizer 10 can include more than one input waveguide 14 and/or more than one output waveguide 24. Additionally, the equalizer 10 is shown with as few as three attenuators 44, however, the equalizer 10 can be employed in conjunction with tens or even hundreds of light signals. As a result, the equalizer 10 can include as many as tens to hundreds of attenuators 44.

Although the example attenuators disclosed above include a plurality of electrical contacts, a variety of other attenuators can be used in conjunction with the equalizer. Suitable attenuators can be constructed with other devices for tuning the index of refraction of the light transmitting medium. For instance, the attenuators can include a temperature control device such as a cooler. Reducing the temperature of the light transmitting medium causes the index of refraction of the light transmitting medium to drop. The index of refraction of a light transmitting medium often changes in response to application of a force to the light transmitting medium. As a result, the attenuators can apply a force to the light transmitting medium. A suitable device for application of a force to the light transmitting medium is a piezoelectric crystal. Further, the index of refraction of a light transmitting medium often changes in response to application of a magnetic field to the light transmitting medium. As a result, the attenuator can apply a tunable magnetic field to the light transmitting medium. A suitable device for application of a magnetic field to the light transmitting medium is a magnetic-optic crystal.

Although employing an attenuator so as to attenuate a plurality of light signals is shown in the context of an equalizer having a functional light distributor, one or more attenuators of a conventional equalizer can be adapted to attenuate a plurality of light signals. As a result, the conventional equalizer will require a reduced number of attenuators.

Although the optical component is disclosed in the context of optical components having ridge waveguides, the principles of the present invention can be applied to optical components having other waveguide types. Suitable waveguide types include, but are not limited to, buried channel waveguides and strip waveguide.

Other embodiments, combinations and modifications of this invention will occur to those of ordinary skill in the art in view of these teachings. Therefore, this invention is to be limited only by the following claims, which include all such embodiments and modifications when viewed in conjunction with the above specification and accompanying drawings.

What is claimed is:

1. An equalizer, comprising:
   a light distributor configured to distribute light signals received through an inlet side across an outlet side, each of the light signals being associated with a different wavelength;
   optics configured so as to cause different light signals to separate as the light signals travel through the light distributor; and
   a plurality of attenuators configured to attenuate the light signals in the light distributor where the light signals are separated from one another.

2. The equalizer of claim 1, wherein the light distributor is configured to contract the light signals received through the inlet side to a focal point.

3. The equalizer of claim 2, wherein the optics configured so as to cause different light signals to separate causes different light signals to contract to focal points located at different regions of the light distributor.

4. The equalizer of claim 2, wherein the light distributor is configured to expand the light signals after the light signals travel past the point of contraction.

5. The equalizer of claim 1, wherein the outlet side includes a plurality of outlet ports and the light distributor is configured to distribute the light signals across a plurality of the outlet ports.

6. The equalizer of claim 5, wherein the outlet ports are in optical communication with an array waveguide grating.

7. The equalizer of claim 5, wherein the array waveguide grating is in optical communication with an outlet light distribution component configured to direct light signals received from the array waveguide grating to a port of an output waveguide.

8. The equalizer of claim 1, wherein the optics include an array waveguide grating.

9. The equalizer of claim 8, wherein the optics are in optical communication with an input light distribution component configured to distribute light signals received from an input waveguide across ports of the array waveguide grating.

10. The equalizer of claim 1, wherein at least one of the attenuators is configured to attenuate a plurality of light signals as the one or more light signals pass through a region of the light distributor where the light signals are separated from one another.

11. The equalizer of claim 1, wherein the attenuators each include a plurality of electrical contacts positioned on the same side of the light distributor.

12. The equalizer of claim 1, wherein the attenuators each include one or more electrical contacts positioned over the light distributor and one or more electrical contacts positioned under the light distributor.

13. The equalizer of claim 1, wherein the light distributor is defined in a light transmitting medium positioned over a base.

14. The equalizer of claim 13, wherein the base includes a pocket, the light distributor being positioned over the pocket.

15. The equalizer of claim 13, wherein the base includes a pocket, portions of the pocket being positioned under one or more of the attenuators, the light transmitting medium contacting the base between at least two of the attenuators.

16. The equalizer of claim 1, wherein the functional light distributor includes grooves between adjacent attenuators.

* * * * *